United States Patent
Itoh et al.

(10) Patent No.: US 9,188,709 B2
(45) Date of Patent: Nov. 17, 2015

(54) OPTICAL MULTIPLEXING APPARATUS AND PROJECTOR

(75) Inventors: Tatsuo Itoh, Osaka (JP); Tetsuro Mizushima, Kumamoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 167 days.

(21) Appl. No.: 13/514,157

(22) PCT Filed: Oct. 12, 2011

(86) PCT No.: PCT/JP2011/005708
§ 371 (c)(1),
(2), (4) Date: Jun. 6, 2012

(87) PCT Pub. No.: WO2012/053167
PCT Pub. Date: Apr. 26, 2012

(65) Prior Publication Data
US 2012/0236212 A1    Sep. 20, 2012

(30) Foreign Application Priority Data

Oct. 19, 2010   (JP) ................. 2010-234316

(51) Int. Cl.
*G03B 21/20* (2006.01)
*G02B 3/00* (2006.01)
*G02B 27/12* (2006.01)

(52) U.S. Cl.
CPC .............. *G02B 3/005* (2013.01); *G02B 3/0056* (2013.01); *G02B 3/0068* (2013.01); *G02B 27/123* (2013.01); *G03B 21/208* (2013.01); *G03B 21/2013* (2013.01)

(58) Field of Classification Search
CPC ................................ G03B 21/00; G03B 21/20
USPC ..................................... 353/83, 102; 359/708
See application file for complete search history.

(56) References Cited

U.S. PATENT DOCUMENTS 4,078,854 A * 3/1978 Yano ............................. 359/458
5,059,008 A * 10/1991 Flood et al. ................ 359/196.1
(Continued)

FOREIGN PATENT DOCUMENTS

JP          5-45605       2/1993
JP          10-293545     11/1998
(Continued)

OTHER PUBLICATIONS

International Search Report issued Jan. 10, 2012 in International (PCT) Application No. PCT/JP2011/005708.

*Primary Examiner* — William C Dowling
*Assistant Examiner* — Jerry Brooks
(74) *Attorney, Agent, or Firm* — Wenderoth, Lind & Ponack, L.L.P.

(57) ABSTRACT

An object of the present invention is to provide an optical multiplexing apparatus and a projector that keep an optical system small, and easily adjust a number of light source units. The optical multiplexing apparatus has: a light source section that uses light source units to emit collimated beams; a first lens portion that converges the collimated beams which enter at different incident angles from each other to define converging positions; and a second lens portion that has focal points that correspond to the converging positions, respectively, wherein the first and second lens portions form an optical reduction system, and an optical axis of the second lens portion, which is directed to the corresponding focal point to one of the converging positions, extends along another optical axis of the second lens position, which is directed to the corresponding focal point to another of the converging positions.

9 Claims, 15 Drawing Sheets

(56) References Cited

U.S. PATENT DOCUMENTS

| | | | | |
|---|---|---|---|---|
| 5,649,753 | A * | 7/1997 | Masumoto | 353/102 |
| 6,075,648 | A * | 6/2000 | Yamamoto et al. | 359/619 |
| 6,325,514 | B1 * | 12/2001 | Yamamoto | 353/31 |
| 6,336,724 | B1 | 1/2002 | Shouji et al. | |
| 7,806,535 | B2 * | 10/2010 | Plut | 353/119 |
| 7,810,931 | B2 | 10/2010 | Kawamura et al. | |
| 2004/0036990 | A1 | 2/2004 | Hanano | |
| 2007/0024977 | A1 | 2/2007 | Kawamura et al. | |
| 2007/0201006 | A1 | 8/2007 | Amano et al. | |

FOREIGN PATENT DOCUMENTS

| | | | |
|---|---|---|---|
| JP | 11-44920 | | 2/1999 |
| JP | 11-119151 | | 4/1999 |
| JP | 2000-180795 | | 6/2000 |
| JP | 2001174916 A | * | 6/2001 |
| JP | 2003-31872 | | 1/2003 |
| JP | 2003-330111 | | 11/2003 |
| JP | 2007-58163 | | 3/2007 |
| JP | 2007-232799 | | 9/2007 |

* cited by examiner

OPTICAL MULTIPLEXING APPARATUS AND PROJECTOR

This application is a U.S. National Phase Application of PCT International Application PCT/JP2011/005708 filed Oct. 12, 2011.

TECHNICAL FIELD

The present invention relates to an optical multiplexing apparatus which multiplexes beams from several light resource units, and a projector which has the optical multiplexing apparatus.

BACKGROUND OF THE INVENTION

Various optical multiplexing apparatuses and projectors for emitting highly bright light at high power have been proposed. For example, Patent Document 1 discloses an illuminator which has a few light source units. The illuminator has a fly-eye lens to which convergent beams emitted from the light source units enter at different incident angles. The illuminator uses the fly-eye lens to multiplex the beams.

Patent Document 2 discloses a display apparatus which projects highly bright light. The display apparatus has a few light source units. The beams from the light source units are collimated, and then enter one fly-eye lens. The incident beams to the fly-eye lens are parallel with each other. The display apparatus uses the fly-eye lens to multiplex the beams.

Patent Document 3 discloses an image display apparatus which has two light sources. The polarization planes of the beams emitted from the light sources are perpendicular to each other. The image display apparatus uses a polarizing prism to multiplex the beams.

Patent Document 4 discloses an illuminator which has a few laser sources for emitting collimated beams. The illuminator has a special prism configured to reduce optical axis intervals of the collimated beams. The illuminator uses an inclined surface of the prism to multiplex the beams.

According to the technologies disclosed in Patent Document 1, the beams multiplexed by the fly-eye lens become divergent light thereafter. Therefore, an increase in a quantity of the light source units increases the divergent angle. This means that the illuminator of Patent Document 1 needs a large optical system to process the multiplexed light.

According to the technologies disclosed in Patent Document 2, an increase in a quantity of the light source units means an increase in collimated beams, which are parallel with each other. Therefore, like the illuminator of Patent Document 1, the display apparatus of Patent Document 2 needs a large optical system to process the multiplexed light.

The image display apparatus of Patent Document 3 uses the polarization planes, which are perpendicular to each other, and the polarizing prism to multiplex the beams. Therefore, a quantity of the light source units, which is available according to the disclosed technologies in Patent Document 3, is limited to two. This means that the disclosed technologies in Patent Document 3 are not directed to increase a quantity of the light source units.

According to the technologies disclosed in Patent Document 4, an increase in a quantity of the light source units means an increase in collimated beams, which are parallel with each other, like the display apparatus of Patent Document 2. The illuminator of Patent Document 4 uses the special prism to reduce the optical axis intervals of the collimated beams, but still needs a large optical system to process the multiplexed light.

Patent Document 1: JP H5-045605 A
Patent Document 2: JP H10-293545 A
Patent Document 3: JP 2000-180795 A
Patent Document 4: JP 2003-31872 A

DISCLOSURE OF THE INVENTION

It is an object of the present invention to provide an optical multiplexing apparatus and a projector, which allow easy adjustment for a quantity of light source units without an optical system getting bigger.

An optical multiplexing apparatus according to one aspect of the present invention has: a light source section which uses light source units to emit collimated beams; a first lens portion which focuses the incident collimated beams at different incident angles from each other to define convergent positions; and a second lens portion which has focal points that correspond to the convergent positions, respectively, wherein the first and second lens portions form an optical reduction system, and an optical axis of the second lens portion, which is directed to the corresponding focal point to one of the convergent positions, extends along another optical axis of the second lens portion, which is directed to the corresponding focal point to another of the convergent positions.

A projector according to another aspect of the present invention has: a signal processor which processes a video signal for displaying an image to generate a control signal; the aforementioned optical multiplexing apparatus; a spatial light modulator which modulates light from the optical multiplexing apparatus in response to the control signal to create image light; and an optical system configured to form the image by means of the image light.

According to the aforementioned optical multiplexing apparatus and projector, the optical system may be less likely to get bigger. It is easy to adjust a quantity of the light source units of the optical multiplexing apparatus and the projector. In addition, the optical multiplexing apparatus and the projector may emit highly bright light.

The objects, features and advantages of the present invention will be more apparent from the following detailed description and the accompanying drawings.

DETAILED DESCRIPTION OF THE INVENTION

Figure 1:
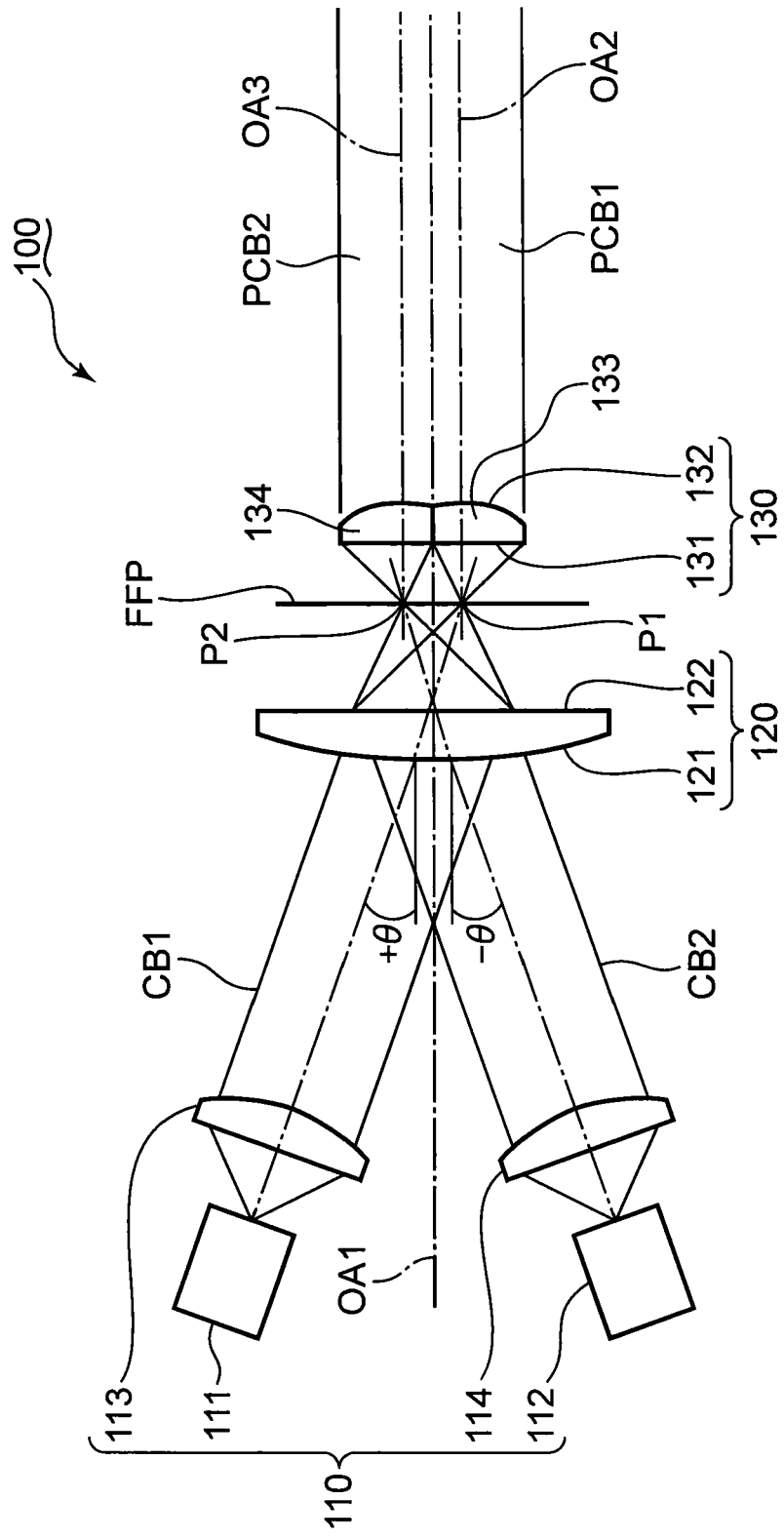
FIG. 1 is a schematic view showing an optical multiplexing apparatus according to the first embodiment.

The optical multiplexing apparatuses and the projector according to various embodiments are described with reference to the drawings. In the following embodiments, the same elements are denoted with the same reference symbols. To make the description clear, redundant explanation is omitted as appropriate. Configurations, arrangements and shapes shown in the drawings and the description related to the drawings are intended to make principle of the optical multiplexing apparatus and the projector easily understood without limiting the principle of the optical multiplexing apparatus and the projector to the description.

<First Embodiment>
(Structure of Optical Multiplexing Apparatus)

FIG. 1 is a schematic view showing an optical multiplexing apparatus 100 according to the first embodiment. The optical multiplexing apparatus 100 is described with reference to FIG. 1.

The optical multiplexing apparatus 100 shown in FIG. 1 has a light source section 110, which emits collimated light fluxes CB1, CB2. The light source section 110 includes light source units 111, 112. Laser sources such as high pressure mercury-vapor lamps, halogen lamps and semiconductor lasers are exemplified as the light source units 111, 112. FIG. 1 shows two light source units 111, 112. However, a quantity of the light source units in the light source section is not limited to two, but may be two or more. In other words, the light source section may have more than two light source units.

The light source section 110 also includes collimate lenses 113, 114. The collimate lens 113 receives the light from the light source unit 111 to create the collimated light flux CB1. The collimate lens 114 receives the light from the light source unit 112 to create the collimated light flux CB2. In this embodiment, the light source section 110 uses the light source units 111, 112 and the collimate lenses 113, 114 to emit the collimated light fluxes CB1, CB2. Another optical structure using several light source units may be used for the light source section if the collimated light fluxes may be emitted. In this embodiment, the collimated light fluxes CB1, CB2 are exemplified as the collimated beams.

The optical multiplexing apparatus 100 also has a first lens portion 120 which receives the collimated light fluxes CB1, CB2 emitted from the light source section 110. The first lens portion 120 includes a convex lens surface 121, which faces the light source section 110, and a flat emitting end surface 122, opposite to the lens surface 121. The collimated light fluxes CB1, CB2 enter the lens surface 121 at different angles from each other. In this embodiment, the collimated light flux CB1 enters the lens surface 121 at an angle "+θ". The collimated light flux CB 2 enters the lens surface 121 at an angle "−θ". The incident positions of the collimated light fluxes CB1, CB2 on the lens surface 121 are symmetrical with respect to the optical axis OA1 of the first lens portion 120. In other words, the light source units 111, 112 (and the collimate lenses 113, 114) are symmetrically arranged with respect to the optical axis OA1 of the first lens portion 120.

The lens surface 121 is designed to define convergent positions of the collimated light fluxes CB1, CB2, respectively. In FIG. 1, the point P1 is a convergent position of the collimated light flux CB1, and the point P2 is a convergent position of the collimated light flux CB2. The first lens portion 120 focuses the collimated light flux CB1 on the point P1 and the collimated light flux CB2 on the point P2.

The optical multiplexing apparatus 100 also has a second lens portion 130, which receives light transmitted through the first lens portion 120. The second lens portion 130 includes a flat incident end surface 131, which faces the first lens portion 120, and a convex lens surface 132 opposite to the incident end surface 131. The light transmitted through the first lens portion 120 enters the incident end surface 131, and then is emitted from the lens surface 132.

The second lens portion 130 includes a lens piece 133, which receives the light from the light source unit 111, and a lens piece 134, which receives the light emitted from the light source unit 112. A focal point of the lens piece 133 matches with the point P1. A focal point of the lens piece 134 matches with the point P2. The lens pieces 133, 134 define a common front focal plane FFP. The first lens portion 120 defines the convergent positions on the front focal plane FFP. The second lens portion 130 has focal points, which match the convergent positions on the front focal plane FFP, respectively.

FIG. 1 shows the optical axis OA2, which is directed to the focal point of the lens piece 133 corresponding to the point P1, and the optical axis OA3, which is directed to the focal point of the lens piece 134 corresponding to the point P2. The optical axis OA2 extends along the optical axis OA3 (i.e., the optical axis OA2 extends substantially in parallel with the optical axis OA3). Preferably, the optical axis OA2 is parallel with the optical axis OA3.

The first and second lens portions 120, 130 form an optical reduction system. Beam diameters of the collimated light fluxes CB1, CB2 are reduced according to a ratio of the focal length between the first and second lens portions 120, 130. The phrase "optical reduction system" means a given optical structure, which has a function to reduce images depicted by the light source units 111, 112. Therefore, the principle of this embodiment is not limited to the optical structure shown in FIG. 1.

Figure 2:
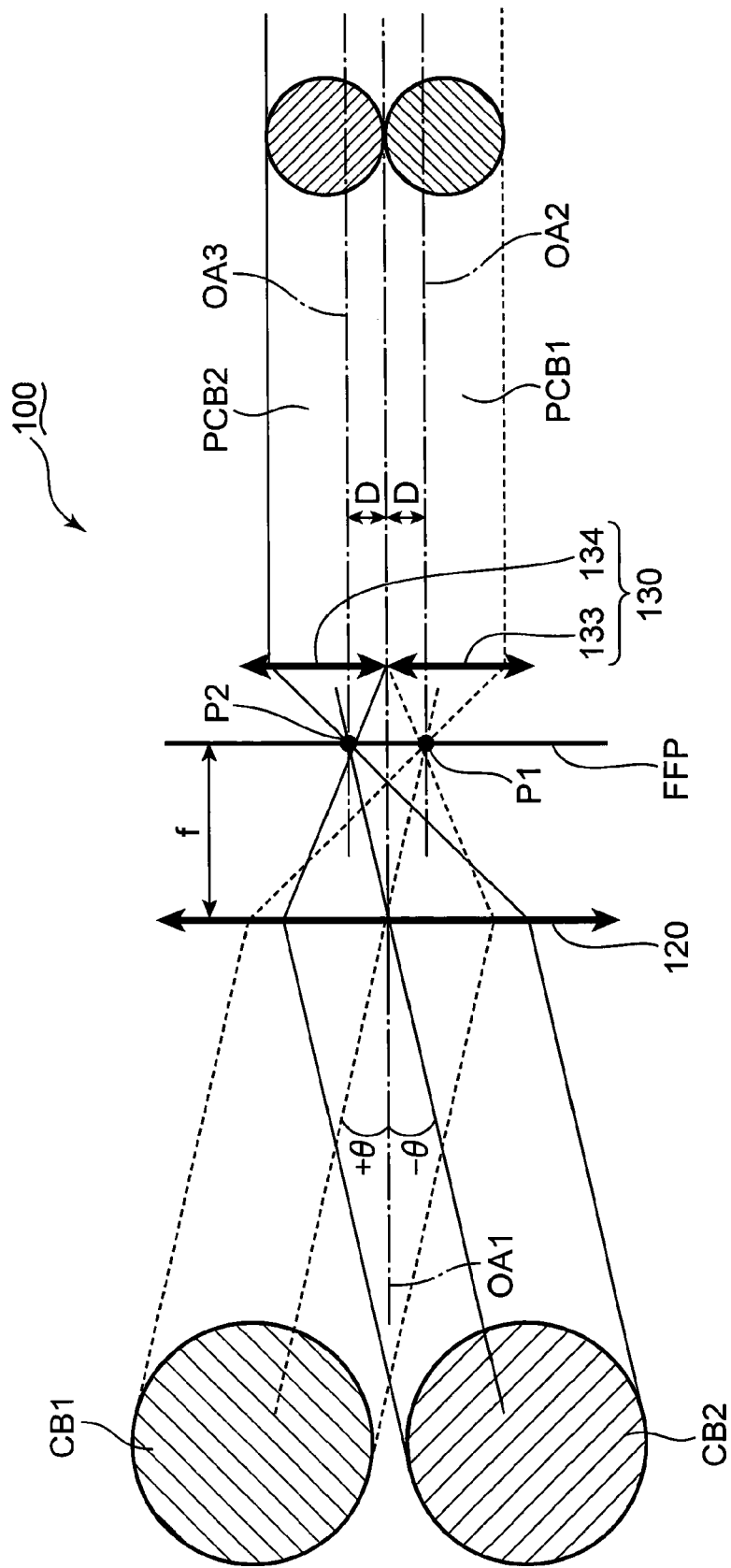
FIG. 2 is a conceptual view showing an optical design of the optical multiplexing apparatus depicted in FIG. 1.

FIG. 2 is a conceptual view showing an optical design of the optical multiplexing apparatus 100 depicted in FIG. 1. The optical multiplexing apparatus 100 is further described with reference to FIGS. 1 and 2.

As described above, the light source section 110 emits the collimated light fluxes CB1, CB2. The collimated light flux CB1 enters the first lens portion 120 at an angle of incidence "+θ". The collimated light flux CB2 enters the first lens portion 120 at an angle of incidence "−θ". In other words, the incident angles of the incident beams (collimated light fluxes CB1, CB2) to the optical reduction system formed by the first and second lens portions 120, 130 are different from each other. The second lens portion 130, which is used as an emitting portion of the optical reduction system, has the optical axes OA2, OA3, which are substantially parallel with each other. As a result, after the beam diameters of the collimated light fluxes CB1, CB2 are reduced, the collimated light fluxes PCB1, PCB2, which propagate along the parallel optical axes OA2, OA3, are generated. Since the collimated light fluxes PCB1, PCB2 are emitted from the second lens portion 130 as one integrated beam, an optical system for processing emitted light from the optical reduction system may be compact. Therefore, even if the collimated light fluxes PCB1, PCB2 from the light source units 111, 112 are multiplexed, a large optical system to process the multiplexed light is not required according to the principle of this embodiment.

According to the principle of the present embodiment, a quantity of the light source units is determined in response to required brightness. Different incident angles to the first lens portion are set in response to a quantity of the light source units. Therefore, according to the principle of this embodiment, the light source units may be added as appropriate.

FIG. 2 shows the focal length "f" (distance from the first lens portion 120 to the front focal plane FFP) of the first lens portion 120. The absolute values of the incident angles of the collimated light fluxes CB1, CB2 to the first lens portion 120 are both "θ". Under these optical conditions, the second lens portion 130 is designed so that the deviation D of the optical axes OA2, OA3 of the lens pieces 133, 134 from the optical axis OA1 of the first lens portion 120 satisfy the following expression.

$$D = f \sin \theta \qquad \text{(Equation 1)}$$

If the relationship of the aforementioned expression is satisfied, the collimated light fluxes PCB1, PCB2 are ideally emitted together as one beam from the second lens portion 130.

In this embodiment, the light source units 111, 112 emit divergent light. Alternatively, the light source units may emit collimated light fluxes. A gas laser, a laser diode pumped solid state laser, and an SHG laser, which includes a second harmonic generation element and a fundamental wave laser, are exemplified as the light source units which emit collimated light fluxes. A collimate lens is not required if the light source unit emits a collimated light flux.

In this embodiment, the lens pieces 133, 134 of the second lens portion 130 are adjacent to each other. Therefore, the light emitted from the optical reduction system formed by the first and second lens portions 120, 130 are processed by means of a small optical system. Optionally, the lens pieces of the second lens portion may be distant from each other.

It is preferable that a reduction ratio of the optical reduction system formed by the first and second lens portions 120, 130 is set to a smaller value than an inverse number of a quantity of the light source units 111, 112 included in the light source section 110. The light source section 110 of this embodiment has the two light source units 111, 112. Therefore, in this embodiment, the reduction ratio of the optical reduction system formed by the first and second lens portions 120, 130 is preferably set to a smaller value than "½", so that the second lens portion 130 may be easily positioned. The collimated light flux (integrated beam of the collimated light fluxes PCB1, PCB2), which is emitted from the optical reduction system, becomes smaller in diameter than the collimated light flux CB1 or CB2.

<Second Embodiment>

Figure 3:
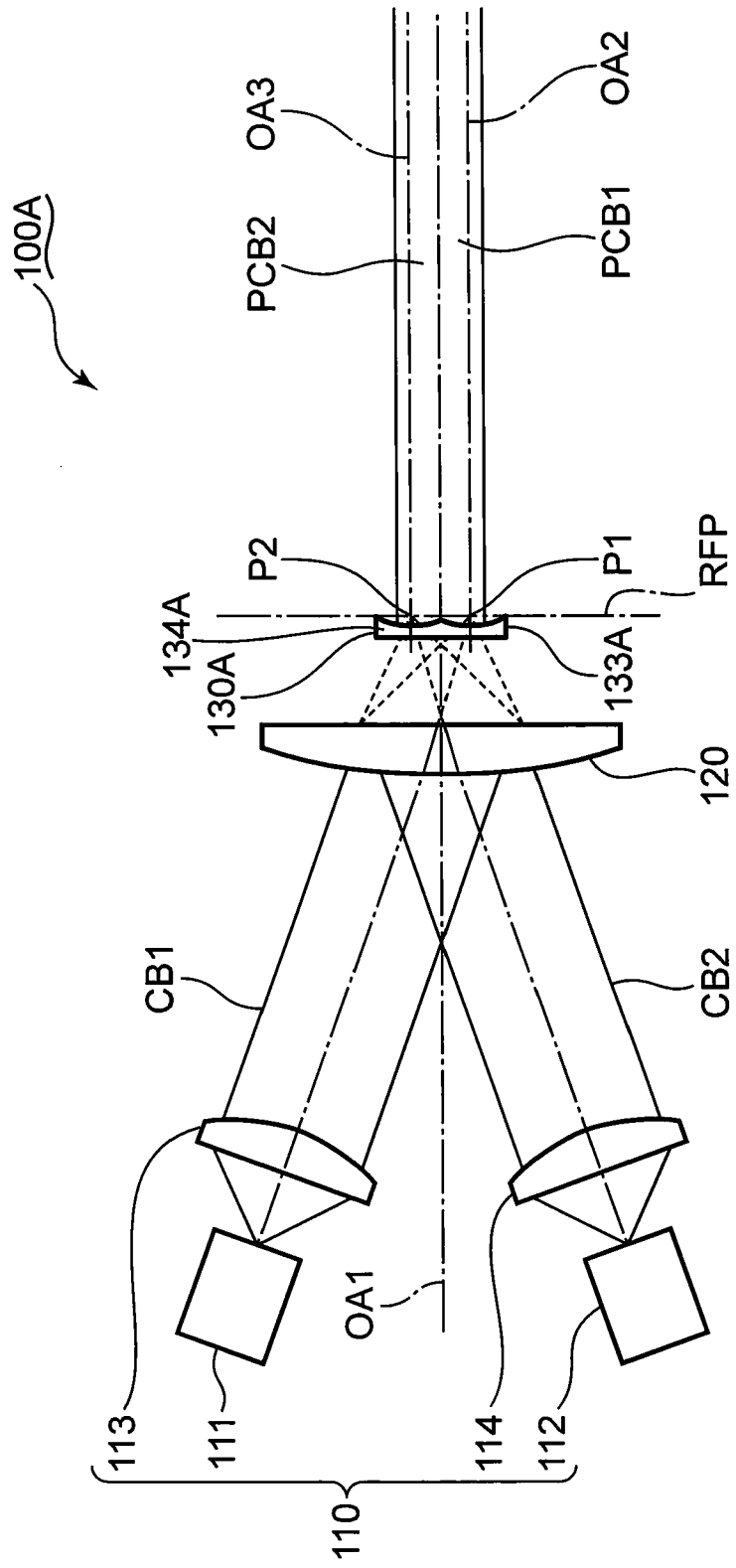
FIG. 3 is a schematic view showing an optical multiplexing apparatus according to the second embodiment.

FIG. 3 is a schematic view showing an optical multiplexing apparatus 100A according to the second embodiment. The optical multiplexing apparatus 100A is described with reference to FIGS. 1 and 3. The same composing elements as those of the optical multiplexing apparatus 100 described in the first embodiment are denoted with the same reference symbols. The description in the first embodiment is used for the same composing elements as those of the optical multiplexing apparatus 100.

Like the optical multiplexing apparatus 100 described in the first embodiment, the optical multiplexing apparatus 100A has the light source section 110 and the first lens portion 120. The optical multiplexing apparatus 100A further has a second lens portion 130A.

Unlike the second lens portion 130 described in the first embodiment, the second lens portion 130A functions as a concave lens. The second lens portion 130A has the lens pieces 133A, 134A.

Unlike the second lens portion 130 described in the first embodiment, the second lens portion 130A is situated between a rear focal plane RFP and the first lens portion 120. Like the lens piece 133 described in the first embodiment, the lens piece 133A of the second lens portion 130A has a focal point, which matches the point P1 (convergent position of the collimated light flux CB1). Like the lens piece 134 described in the first embodiment, the lens piece 134A of the second lens portion 130A has a focal point, which matches the point P2 (convergent position of the collimated light flux CB2). As a result, the first and second lens portions 120, 130A form an optical reduction system. In this embodiment, the first lens portion 120 defines the convergent positions of the collimated light fluxes CB1, CB2 on the rear focal plane RFP. The lens pieces 133A, 134A of the second lens portion 130A define the common rear focal plane RFP.

Since the second lens portion 130A functions as a concave lens, a distance between the first and second lens portions 120, 130A becomes shorter than the distance between the first and second lens portions 120, 130 described in the first embodiment. Therefore, the optical multiplexing apparatus 100A of the second embodiment may become smaller in size than the optical multiplexing apparatus 100 of the first embodiment.

In the first and second embodiments, the optical axes OA2, OA3 of the second lens portion 130 or 130A are substantially parallel with the optical axis OA1 of the first lens portion 120. Alternatively, optical designs of the first lens portion 120 and the second lens portion 130 or 130A may be determined so that the optical axes OA2, OA3 of the second lens portion 130 or 130A are inclined from the optical axis OA1 of the first lens portion 120.

<Third Embodiment>

Figure 4:
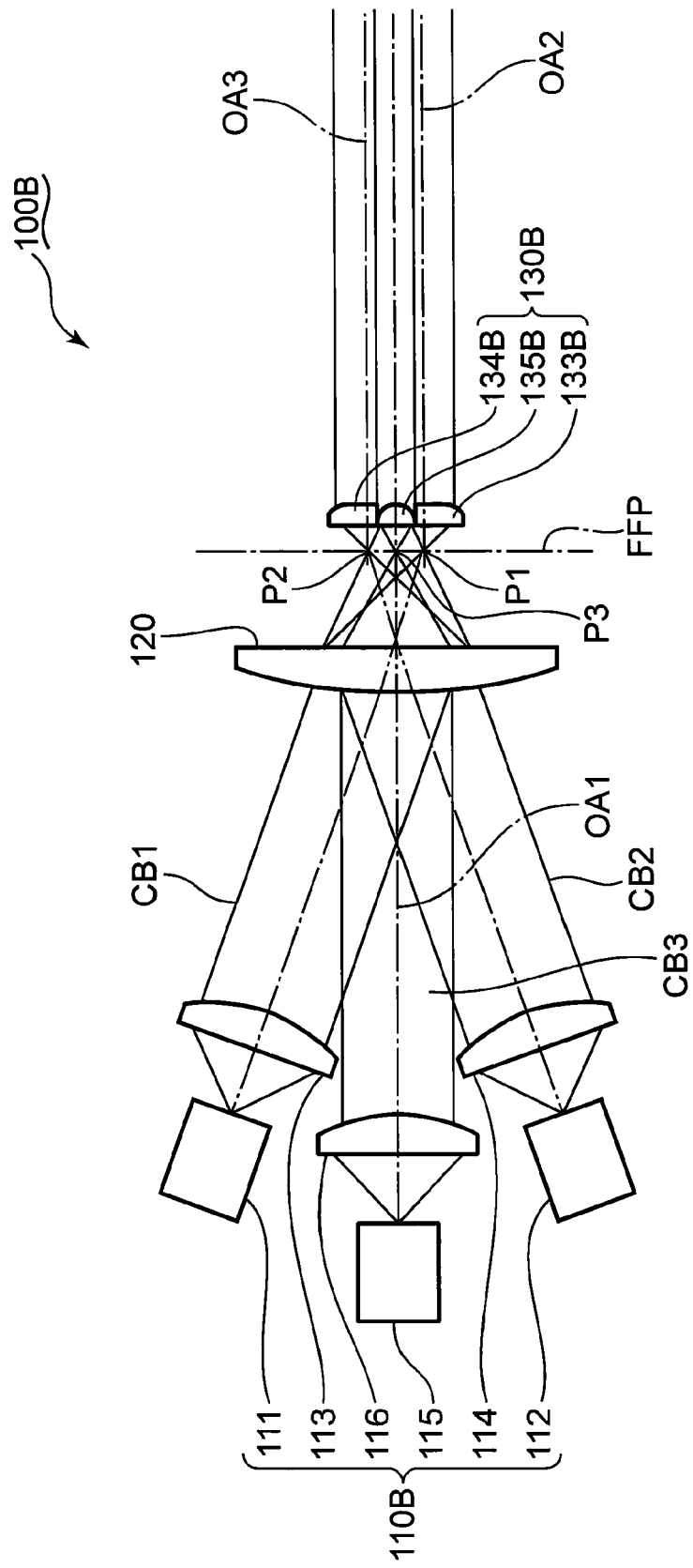
FIG. 4 is a schematic view showing an optical multiplexing apparatus according to the third embodiment.

FIG. 4 is a schematic view showing an optical multiplexing apparatus 100B according to the third embodiment. The optical multiplexing apparatus 100B is described with reference to FIG. 4. The same composing elements as those of the optical multiplexing apparatus 100 described in the first embodiment are denoted with the same reference symbols. The description in the first embodiment is used for the same composing elements as those of the optical multiplexing apparatus 100.

The optical multiplexing apparatus 100B has a light source section 110B and a second lens portion 130B in addition to the first lens portion 120 described in the first embodiment.

The light source section 110B has the light source units 111, 112 and the collimate lenses 113, 114 like the light source section 110 described in the first embodiment. The light source section 110B also has a light source unit 115 and a collimate lens 116, which receives light from the light source unit 115. The light source unit 115 may be a laser source such as a mercury-vapor lamp, a halogen lamp and a semiconductor laser, like the light source units 111, 112. The collimate lens 116 receives the light from the light source unit 115 to generate a collimated light flux CB3.

The first lens portion 120 focuses the collimated light flux CB1, which is generated by the light source unit 111 and the collimate lens 113, on the point P1. The first lens portion 120 also focuses the collimated light flux CB2, which is generated by the light source unit 112 and the collimate lens 114, on the point P2. The first lens portion 120 also focuses the collimated light flux CB3, which is generated by the light source unit 115 and the collimate lens 116, on the point P3. The points P1, P2, P3 are aligned on the front focal plane FFP, which is defined by the second lens portion 130B. The point P3 defined between the points P1, P2 is situated on the optical axis OA1 of the first lens portion 120.

The second lens portion 130B includes a lens piece 133B, which receives light emitted from the light source unit 111, a lens piece 134B, which receives light emitted from the light source unit 112, and a lens piece 135B, which receives light emitted from the light source unit 115. A focal point of the lens piece 133B matches the point P1. A focal point of the lens piece 134B matches the point P2. A focal point of the lens piece 135B between the lens pieces 133B, 134B matches the point P3.

FIG. 4 shows the optical axis OA2, which is directed to the focal point of the lens piece 133B corresponding to the point P1, and the optical axis OA3, which is directed to the focal point of the lens piece 134B corresponding to the point P2. An optical axis of the lens piece 135B matches the optical axis OA1 of the first lens portion 120. Likewise, an optical axis between the light source unit 115 and the collimate lens 116 also match the optical axis OA1 of the first lens portion 120. Therefore, the collimated light flux CB3, which is generated by the light source unit 115 and the collimate lens 116, travels along the optical axis of the first lens portion 120. In this embodiment, the light source unit 115 is exemplified as the first light source unit. As described in the first embodiment, the collimated light fluxes CB1, CB2, which are generated by the light source units 111, 112 and the collimate lenses 113, 114, propagate in an inclined direction from the optical axis OA1. The light source units 111, 112 and the collimate lenses 113, 114 are exemplified as the second light source unit.

As described in the first embodiment, the light source units 111, 112 and the collimate lenses 113, 114 are symmetrically arranged with respect to the optical axis OA1. The lens piece 133B, which receives light from the light source unit 111, and the lens piece 134B, which receives light from the light source unit 112, are also symmetrically arranged with respect to the optical axis OA1. Therefore, the lens pieces 133B, 134B is identical in shape to each other.

As described above, the light source unit 115, the collimate lens 116, the first lens portion 120 and the lens piece 135B of the optical multiplexing apparatus 100B are aligned on the optical axis OA1. Therefore, it becomes easy to adjust various optical elements of the optical multiplexing apparatus 100B in position.

For example, a groove may be formed on a substrate on the basis of the optical axis OA1 to mount various optical elements of the optical multiplexing apparatus 100B on the substrate. The optical multiplexing apparatus 100B may be formed by inserting the optical elements into the groove.

Alternatively, various optical elements of the optical multiplexing apparatus 100B may have a consistent diameter. A cylinder to enclose these optical elements may be provided. If the various optical elements of the optical multiplexing apparatus 100B are enclosed in the cylinder, the optical elements of the optical multiplexing apparatus 100B are easily aligned on the basis of the optical axis OA1.

As described above, the light source units 111, 112 and the collimate lenses 113, 114 are symmetrically arranged with respect to the optical axis OA1. As a result, the lens pieces 133B, 134B have the same shape. This means that only two types of shapes are used for the lens pieces 133B, 134B, 135B of the second lens portion 130B to reduce a manufacturing cost of the second lens portion 130B.

<Fourth Embodiment>

Figure 5:
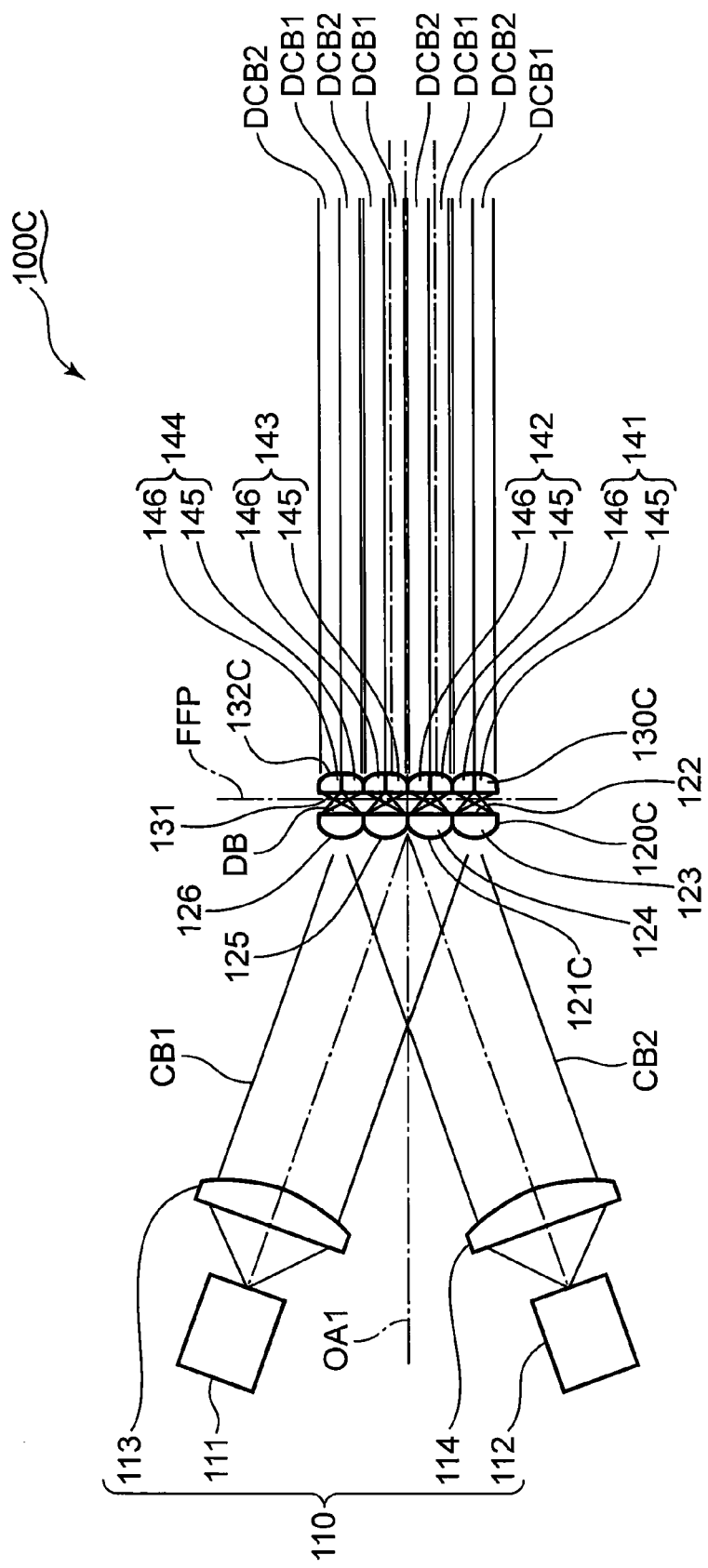
FIG. 5 is a schematic view showing an optical multiplexing apparatus according to the fourth embodiment.

FIG. 5 is a schematic view showing an optical multiplexing apparatus 100C according to the fourth embodiment. The optical multiplexing apparatus 100C is described with reference to FIG. 5. The same composing elements as those of the optical multiplexing apparatus 100 described in the first embodiment are denoted with the same reference symbols. The description in the first embodiment is used for the same composing elements as those of the optical multiplexing apparatus 100.

Like the optical multiplexing apparatus 100 described in the first embodiment, the optical multiplexing apparatus 100C has the light source section 110. The collimated light fluxes CB1, CB2 are emitted from the light source section 110.

The optical multiplexing apparatus 100C has a first lens portion 120C, which receives the collimated light fluxes CB1, CB2 emitted from the light source section 110, and a second lens portion 130C, which receives transmitted light through the first lens portion 120C. The first lens portion 120C is a cylindrical lens array, which splits the collimated light fluxes CB1, CB2 to create several split light fluxes DB. In this embodiment, the split light flux DB is exemplified as the split beam.

The second lens portion 130C is a cylindrical lens array, which corremates the split light fluxes DB to create collimated light fluxes DCB1, DCB2 (described later). The cylindrical lens array, which is used as the second lens portion 130C, defines a common front focal plane FFP. The cylindrical lenses of the cylindrical lens array, which is used as the first lens portion 120C, focus the collimated light fluxes CB1, CB2 on the front focal plane FFP, respectively.

Figure 6:
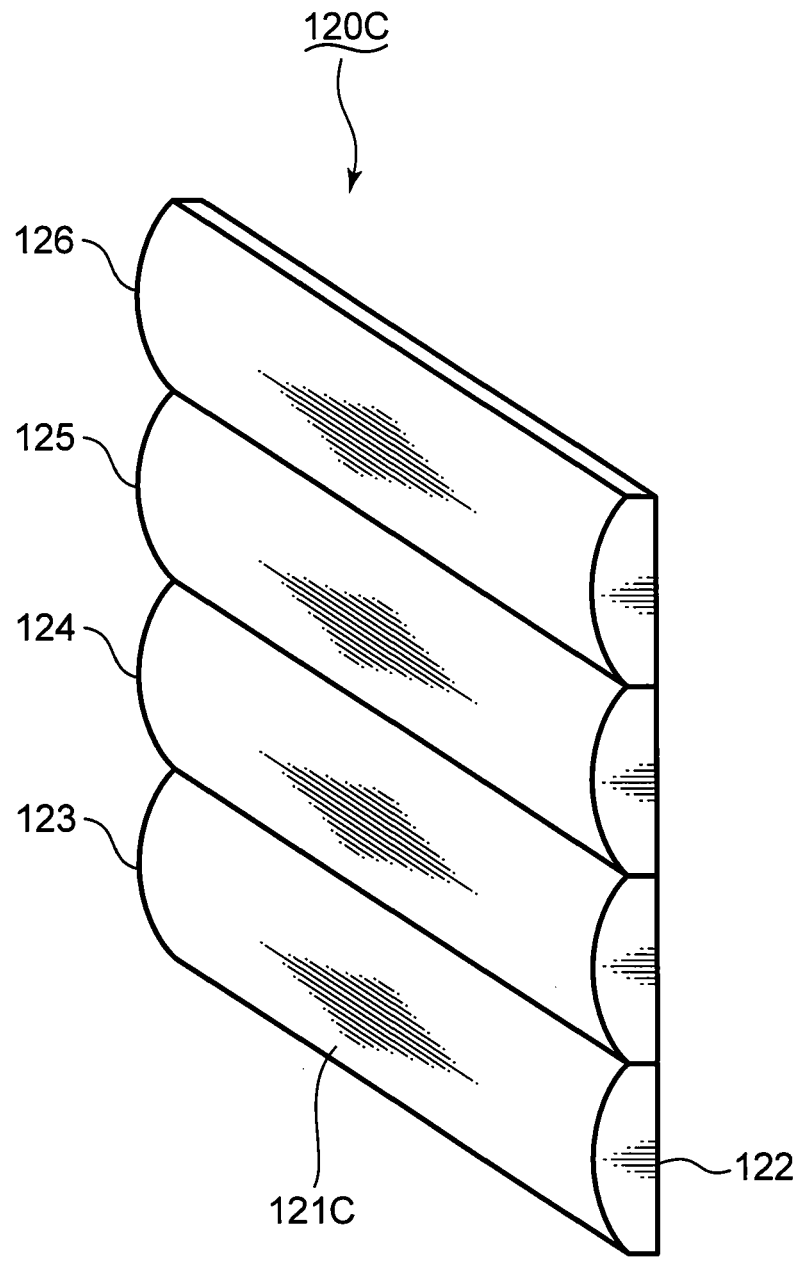
FIG. 6 is a schematic perspective view showing a first lens portion of the optical multiplexing apparatus depicted in FIG. 5.
Figure 7:
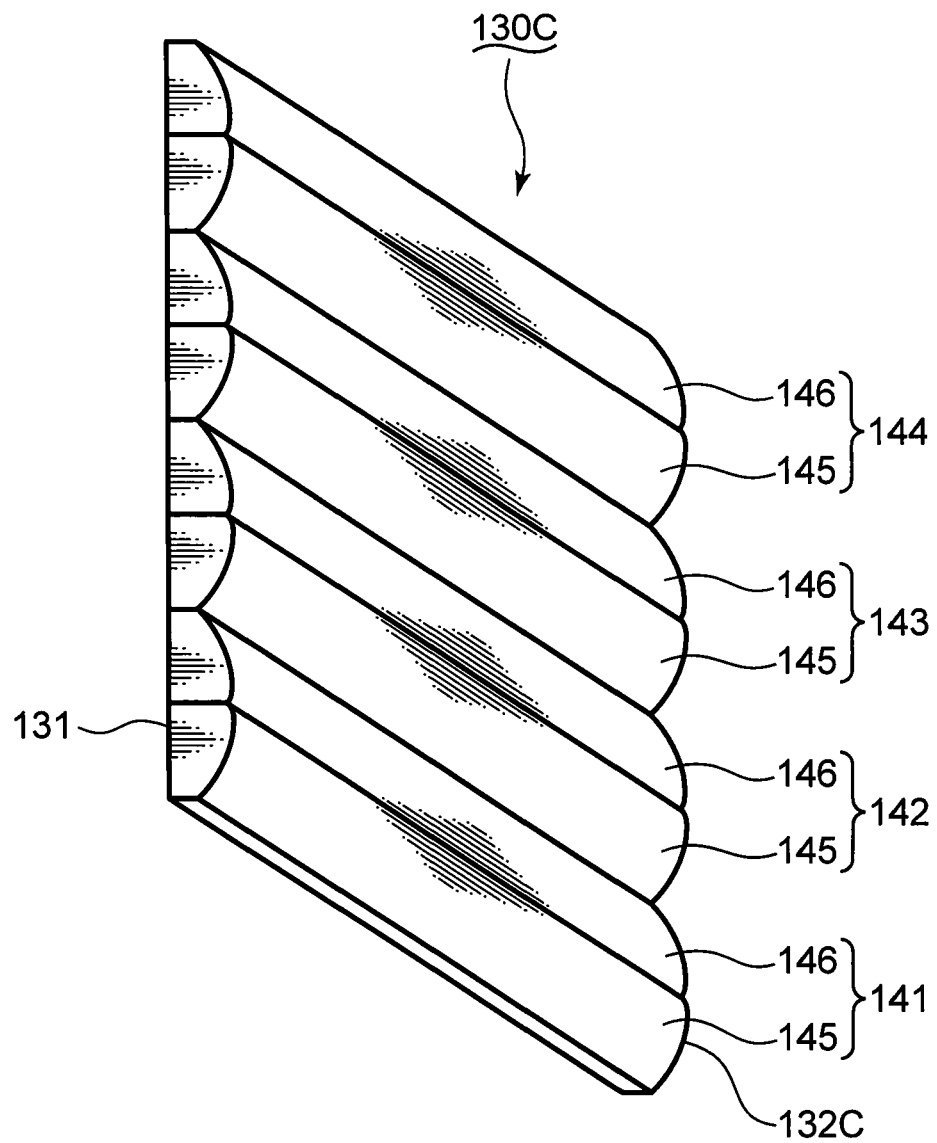
FIG. 7 is a schematic perspective view showing a second lens portion of the optical multiplexing apparatus depicted in FIG. 5.

FIG. 6 is a schematic perspective view showing the first lens portion 120C. FIG. 7 is a schematic perspective view showing the second lens portion 130C. The optical multiplexing apparatus 100C is further described with reference to FIGS. 5 to 7.

The first lens portion 120C includes a convex lens surface 121C, which faces the light source section 110, and an emitting end surface 122 opposite to the lens surface 121C. As the first lens portion 120C, FIG. 6 shows a cylindrical lens array, which has four cylindrical lenses 123, 124, 125 and 126 that are two-dimensionally arrayed. Each of the cylindrical lenses 123, 124, 125 and 126 focuses the collimated light fluxes CB1, CB2 on the front focal plane FFP. Therefore, eight convergent positions are defined on the front focal plane FFP. A number of convergent positions of the collimated light fluxes correspond to a value, which is obtained by multiplying a quantity of the light source units used for the light source section by a quantity of cylindrical lenses of the cylindrical lens array used as the first lens portion.

The second lens portion 130C includes a flat incident end surface 131, which faces the first lens portion 120C, and a convex lens surface 132C opposite to the incident end surface 131. Transmitted light through the first lens portion 120C enters the incident end surface 131, and is then emitted from the lens surface 132C. As the second lens portion 130C, FIG. 7 shows a cylindrical array, which has four cylindrical lenses 141, 142, 143 and 144 that are two-dimensionally arranged. Each of the cylindrical lenses 141, 142, 143 and 144 includes first and second lens pieces 145, 146. The first and second lens pieces 145, 146 are alternately arranged.

Each of the first lens pieces 145 has a focal point at the convergent position of the collimated light flux CB1 on the front focal plane FFP. Therefore, each of the first lens pieces 145 receives light emitted from the light source unit 111 to create the collimated light flux DCB1.

Each of the second lens pieces 146 has a focal point at the convergent position of the collimated light flux CB2 on the front focal plane FFP. Therefore, each of the second lens pieces 146 receives light emitted from the light source unit 112 to create the collimated light flux DCB2.

Like the first embodiment, the first and second lens portions 120C, 130C form an optical reduction system.

As described above, the first lens portion 120C splits the collimated light fluxes CB1, CB2 to create split light fluxes DB, respectively. The split beams DB converge on the front focal plane FFP. The convergent positions of the split collimated light fluxes CB1, CB2 (i.e., split light fluxes DB) are alternately arranged on the front focal plane FFP. The split light fluxes DB generated from the collimated light fluxes CB1, CB2 spread after the front focal plane FFP, and enter the incident end surface 131 of the second lens portion 130C. The split light fluxes DB generated from the collimated light fluxes CB1 enter the first lens piece 145. The split light fluxes DB generated from the collimated light flux CB2 enter the second lens piece 146. As described above, the first and second lens pieces 145, 146 are alternately arranged. Therefore, the collimated light fluxes DCB1, which are emitted through the first lens piece 145, and the collimated light fluxes DCB2, which are emitted through the second lens piece 146, are alternately arranged. As a result, even if an intensity of the collimated light flux CB1, which is emitted by the light source unit 111 and the collimate lens 113, is different from an intensity of the collimated light flux CB2, which is emitted by the light source unit 112 and the collimate lens 114, the light emitted from the second lens portion 130C is formed by beam components (collimated light fluxes DCB1, DCB2), which are alternately arranged. Therefore, a fluctuation of intensity distribution becomes less noticeable.

<Fifth Embodiment>

Figure 8:
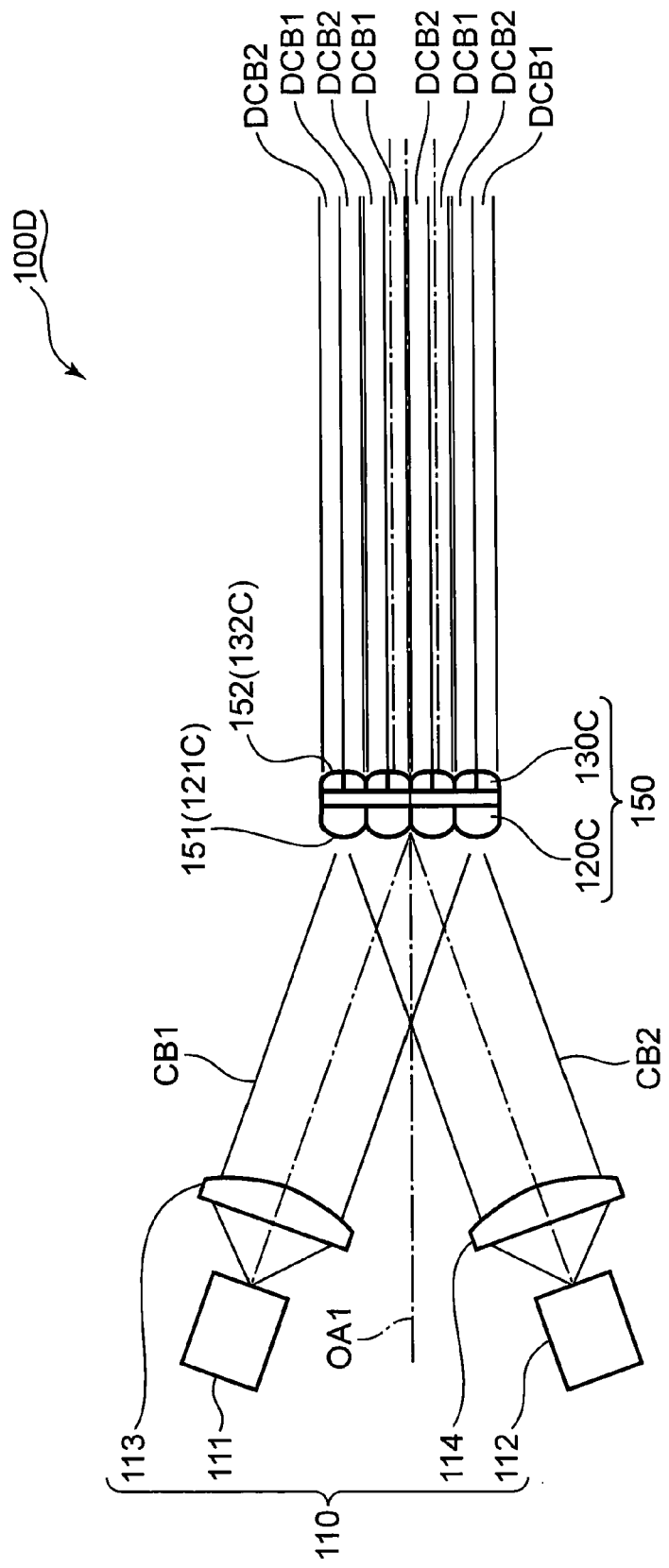
FIG. 8 is a schematic view showing an optical multiplexing apparatus according to the fifth embodiment.

FIG. 8 is a schematic view showing an optical multiplexing apparatus 100D according to the fifth embodiment. The optical multiplexing apparatus 100D is described with reference to FIG. 8. The same composing elements as those of the optical multiplexing apparatus 100C described in the fourth embodiment are denoted with the same reference symbols. The description in the fourth embodiment is used for the same composing elements as those of the optical multiplexing apparatus 100C.

Like the optical multiplexing apparatus 100C described in the fourth embodiment, the optical multiplexing apparatus 100D has the light source section 110. The collimated light fluxes CB1, CB2 are emitted from the light source section 110.

The optical multiplexing apparatus 100D has a substrate 150. The first lens portion 120C (cylindrical lens array) and the second lens portion 130C (cylindrical lens array), which are described in the fourth embodiment, are integrated on the substrate 150.

Figure 9:
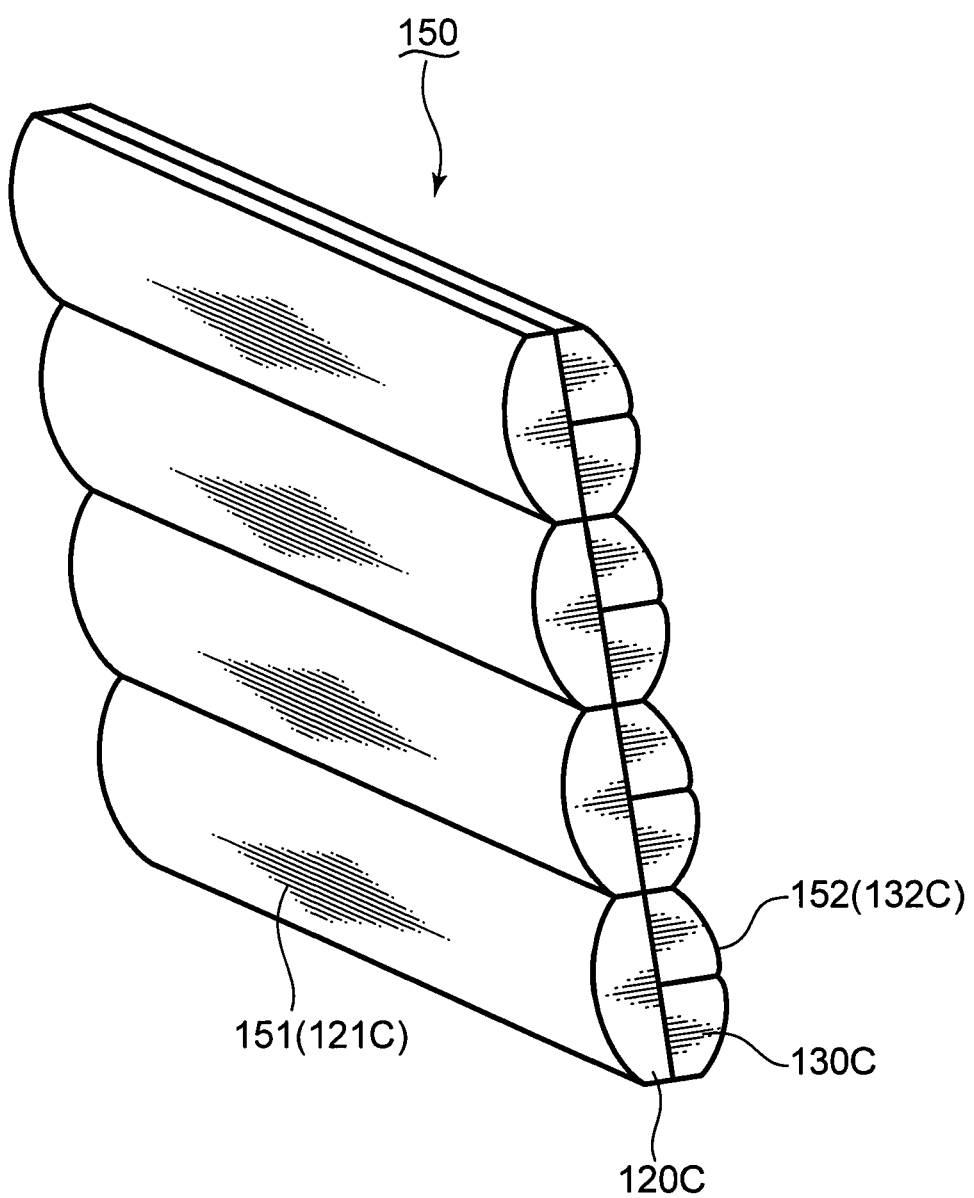
FIG. 9 is a schematic perspective view showing a substrate of the optical multiplexing apparatus depicted in FIG. 8.

FIG. 9 is a schematic perspective view showing the substrate 150. The optical multiplexing apparatus 100D is further described with reference to FIGS. 8 and 9.

The substrate 150 includes a first surface 151, which faces the light source section 110, and a second surface 152 opposite to the first surface 151. The first surface 151 corresponds to the lens surface 121C of the first lens portion 120C described in the fourth embodiment. The second surface 152 corresponds to the lens surface 132C of the second lens portion 130C described in the fourth embodiment.

In this embodiment, the first and second lens portions 120C, 130C are integrated on the substrate 150. Therefore, the optical multiplexing apparatus 100D may use a fewer number of components to emit collimated light fluxes DCB1, DCB2, which are alternately arranged, in comparison with the optical multiplexing apparatus 100C described in the fourth embodiment. Unlike the optical multiplexing apparatus 100C described in the fourth embodiment, alignment between the first and second lens portions 120C, 130C is not required during assembly of the optical multiplexing apparatus 100D.

A variant form of the optical multiplexing apparatuses 100C, 100D described in the fourth and fifth embodiments is described with reference to FIG. 5.

In the fourth and fifth embodiments, the focal positions of the second lens portion 130C perfectly matches the convergent positions of the split light fluxes DB defined by the first lens portion 120C, respectively. Alternatively, the focal positions of the second lens portion may be slightly shifted in the optical axis direction from the convergent positions defined by the first lens portion. Therefore, the light emitted from the second lens portion becomes a slightly divergent light or slightly convergent light, instead of the collimated light fluxes DCB1, DCB2. In this case, the beams emitted through the first and second lens pieces of the second lens portion slightly overlap. Therefore, an intensity variation of the emitted light from the second lens portion, which results from an intensity difference between the collimated light fluxes CB1, CB2, may be reduced.

<Sixth Embodiment>

Figure 10:
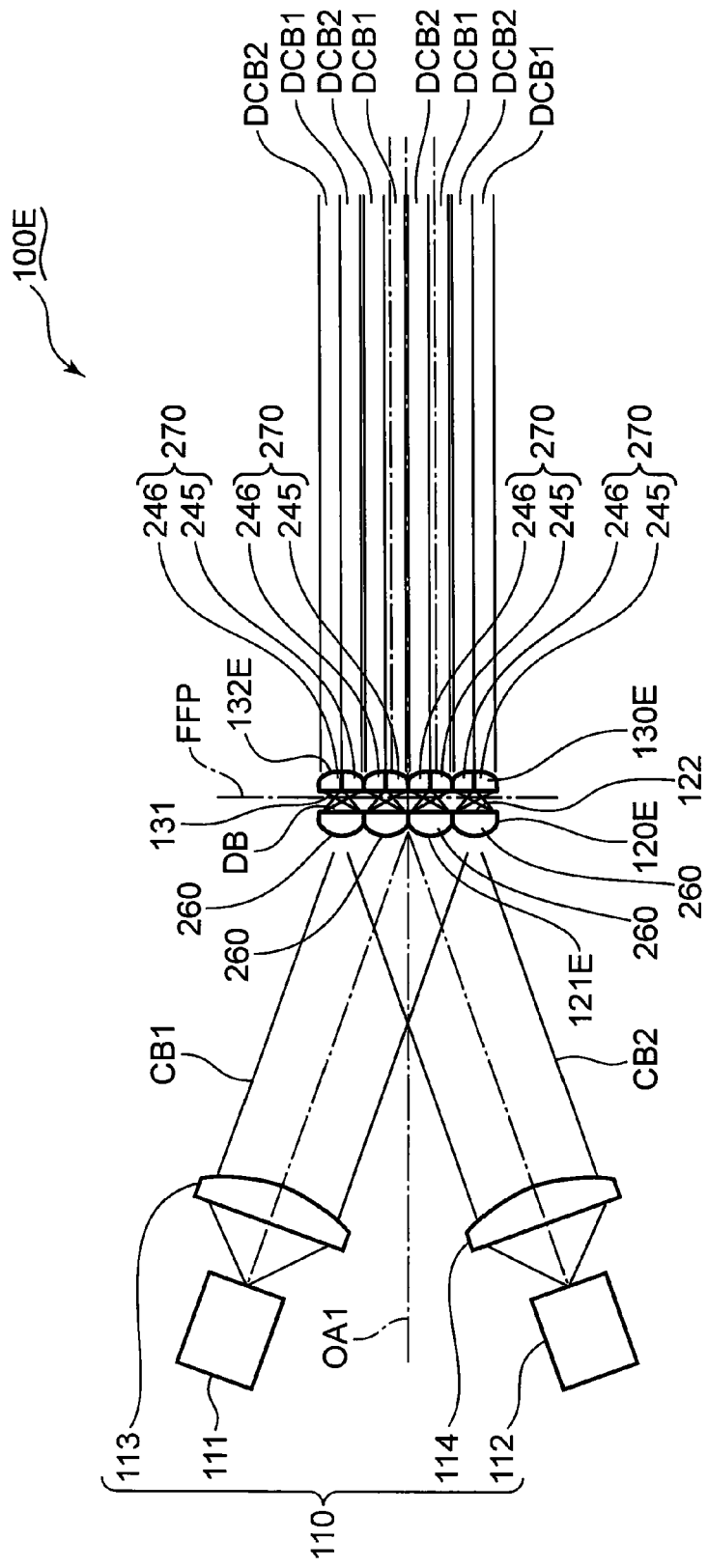
FIG. 10 is a schematic view showing an optical multiplexing apparatus according to the sixth embodiment.

FIG. 10 is a schematic view showing an optical multiplexing apparatus 100E according to the sixth embodiment. The optical multiplexing apparatus 100E is described with reference to FIG. 10. The same composing elements as those of the optical multiplexing apparatus 100C described in the fourth embodiment are denoted with the same reference symbols. The description in the fourth embodiment is used for the same composing elements as those of the optical multiplexing apparatus 100C.

Like the optical multiplexing apparatus 100C described in the fourth embodiment, the optical multiplexing apparatus 100E has the light source section 110. The collimated light fluxes CB1, CB2 are emitted from the light source section 110.

The optical multiplexing apparatus 100E further has a first lens portion 120E, which receives the collimated light fluxes CB1, CB2 emitted from the light source section 110, and a second lens portion 130E, which receives transmitted light through the first lens portion 120E. The first lens portion 120E is a micro-lens array, which splits the collimated light fluxes CB1, CB2 to create several split light fluxes DB. In this embodiment, the split light flux DB is exemplified as the split beam.

The second lens portion 130E is a micro-lens array which collimates the split light fluxes DB to create collimated light fluxes DCB1, DCB2 (described later). The micro-lens array, which is used as the second lens portion 130E, defines the common front focal plane FFP. The micro-lenses of the micro-lens array, which is used as the first lens portion 120E, focus the collimated light fluxes CB1, CB2 on the front focal plane FFP, respectively.

Figure 11:
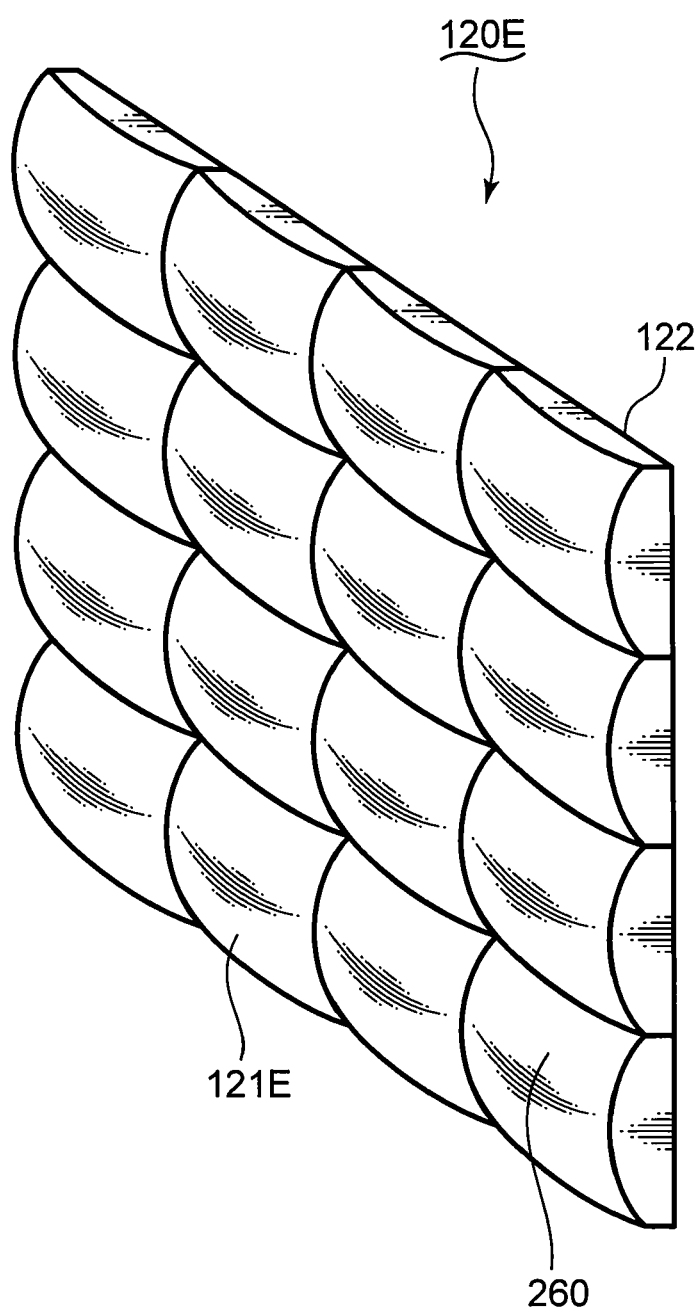
FIG. 11 is a schematic perspective view showing a first lens portion of the optical multiplexing apparatus depicted in FIG. 10.
Figure 12:
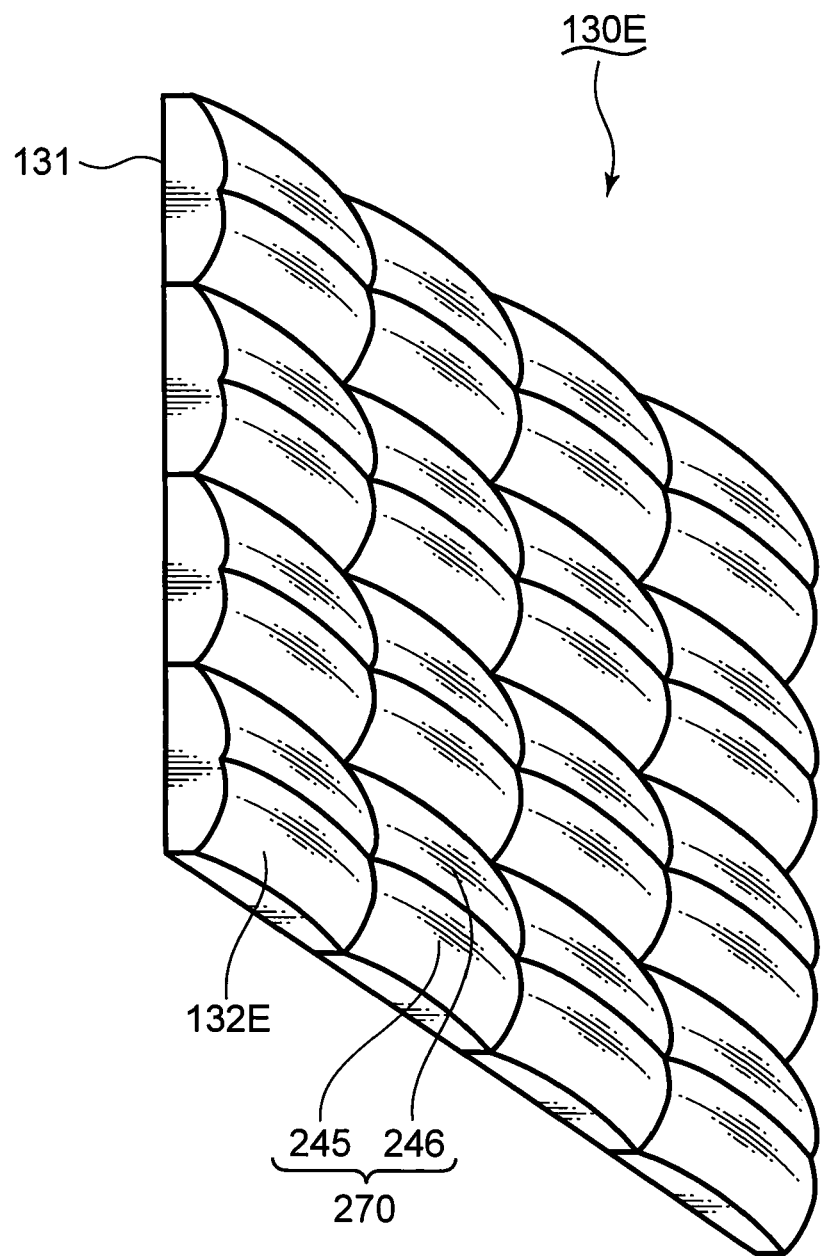
FIG. 12 is a schematic perspective view showing a second lens portion of the optical multiplexing apparatus depicted in FIG. 10.

FIG. 11 is a schematic perspective view showing the first lens portion 120E. FIG. 12 is a schematic perspective view showing the second lens portion 130E. The optical multiplexing apparatus 100E is further described with reference to FIGS. 10 to 12.

The first lens portion 120E includes a convex lens surface 121E, which faces the light source section 110, and an emitting end surface 122 opposite to the lens surface 121E. As the first lens portion 120E, FIG. 11 shows a micro-lens array, which has micro-lenses 260 that are two-dimensionally arranged (in a matrix). Each of the micro-lenses 260 focuses the collimated light fluxes CB1, CB2 on the front focal plane FFP.

The second lens portion 130E includes a flat incident end surface 131, which faces the first lens portion 120E, and a convex lens surface 132E opposite to the incident end surface 131. Transmitted light through the first lens portion 120E enters the incident end surface 131, and is then emitted from the lens surface 132E. As the second lens portion 130E, FIG. 12 shows a micro-lens array, which has micro-lenses 270 that are two-dimensionally arranged. Each of the micro-lenses 270 includes first and second lens pieces 245, 246. The first and second lens pieces 245, 246 are alternately arranged (in the vertical direction in FIG. 12).

Each of the first lens pieces 245 has a focal point at the convergent position of the collimated light flux CB1 on the front focal plane FFP. Therefore, each of the first lens pieces 245 receives light emitted from the light source unit 111 to create the collimated light flux DCB1.

Each of the second lens pieces 246 has a focal point at the convergent position of the collimated light flux CB2 on the front focal plane FFP. Therefore, each of the second lens pieces 246 receives light emitted from the light source unit 112 to create the collimated light flux DCB2.

Like the first embodiment, the first and second lens portions 120E, 130E form an optical reduction system.

As described above, the first lens portion 120E splits the collimated light fluxes CB1, CB2 to create split light fluxes DB, respectively. The split beams DB converge on the front focal plane FFP. The convergent positions of the split collimated light fluxes CB1, CB2 (i.e., split light fluxes DB) are two-dimensionally arranged on the front focal plane FFP (in a matrix). The split light fluxes DB generated from the collimated light fluxes CB1, CB2 spread after the front focal plane FFP, and enter the incident end surface 131 of the second lens portion 130E. The split light fluxes DB generated from the collimated light flux CB1 enter the first lens piece 245. The split light fluxes DB generated from the collimated light flux CB2 enter the second lens piece 246. As described above, the first and second lens pieces 245, 246 are two-dimensionally arranged (in a matrix). Therefore, the collimated light fluxes DCB1, which are emitted through the first lens piece 245, and the collimated light fluxes DCB2, which are emitted through the second lens piece 246, are two-dimensionally arranged (in a matrix). As a result, even if an intensity of the collimated light flux CB1, which is emitted from the light source unit 111 and the collimate lens 113, is different from an intensity of the collimated light flux CB2, which is emitted from the light source unit 112 and the collimate lens 114, the light emitted through the second lens portion 130E is formed by beam components (collimated light fluxes DCB1, DCB2) which are two-dimensionally arranged (in a matrix). Therefore, a fluctuation of the intensity distribution becomes less noticeable.

In this embodiment, the first and second lens portions 120E, 130E are formed as separate components. Alternatively, the first and second lens portions 120E, 130E may be integrated on a substrate according to the principle described in the fifth embodiment. If the first lens portion 120E is formed on a first surface of the substrate, which faces the light source section, and the second lens portion 130E is formed on a second surface opposite to the first surface, then the collimated light fluxes DCB1, DCB2, which are two-dimensionally arranged (in a matrix), may be emitted by means of a relatively few number of components. The optical multiplexing apparatus may be assembled without requiring alignment between the first and second lens portions 120E, 130E.

<Seventh Embodiment>

Figure 13:
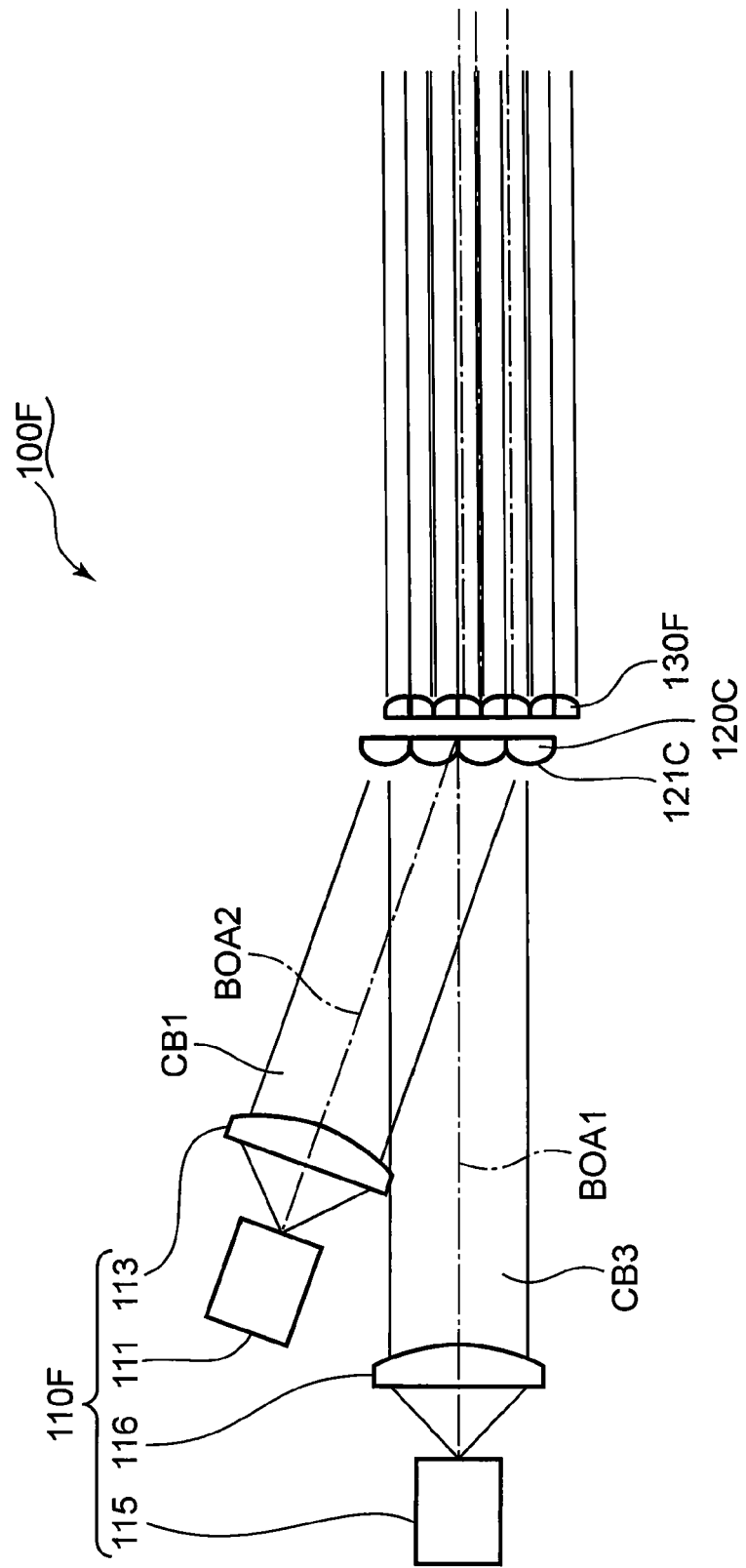
FIG. 13 is a schematic view showing an optical multiplexing apparatus according to the seventh embodiment.

FIG. 13 is a schematic view showing an optical multiplexing apparatus 100F according to the seventh embodiment. The optical multiplexing apparatus 100F is described with reference to FIG. 13. The same composing elements as those of the optical multiplexing apparatuses 100B, 100C described in the third and fourth embodiments are denoted with the same reference symbols. The description in the third and fourth embodiments is used for the same composing elements as those of the optical multiplexing apparatuses 100B, 100C.

The optical multiplexing apparatus 100F has a light source section 110F, which irradiates light onto the first lens portion 120C, in addition to the first lens portion 120C described in the fourth embodiment. The light source section 110F has the light source unit 115 and the collimate lens 116 described in the third embodiment. The light source section 110F also has the light source unit 111 and the collimate lens 113 described in the fourth embodiment.

The light source unit 115 and the collimate lens 116 directly face the lens surface 121C of the first lens portion 120C. FIG. 13 shows the optical axis BOA1 which connects the light source unit 115, the collimate lens 116 and the first lens portion 120C. The collimated light flux CB3, which is emitted via the collimate lens 116, propagates along the optical axis BOA1.

FIG. 13 shows the optical axis BOA2 which connects the light source unit 111, the collimate lens 113 and the first lens portion 120C. The optical axis BOA2 connecting the light source unit 111, the collimate lens 113 and the first lens portion 120C is inclined from the optical axis BOA1. The collimated light flux CB1 emitted via the collimate lens 113 propagates along the optical axis BOA2.

The optical multiplexing apparatus 100F further has a second lens portion 130F, which receives light transmitted through the first lens portion 120C. The second lens portion 130F is the same cylindrical lens array as that of the second lens portion 130C described in the fourth embodiment. A shape of the second lens portion 130F and an arrangement of the cylindrical lenses are the same as those of the second lens portion 130C. The central point of the second lens portion 130C described in the fourth embodiment directly faces the central point of the first lens portion 120C, but the central point of the second lens portion 130F is shifted from the central point of the first lens portion 120C.

Figure 14:
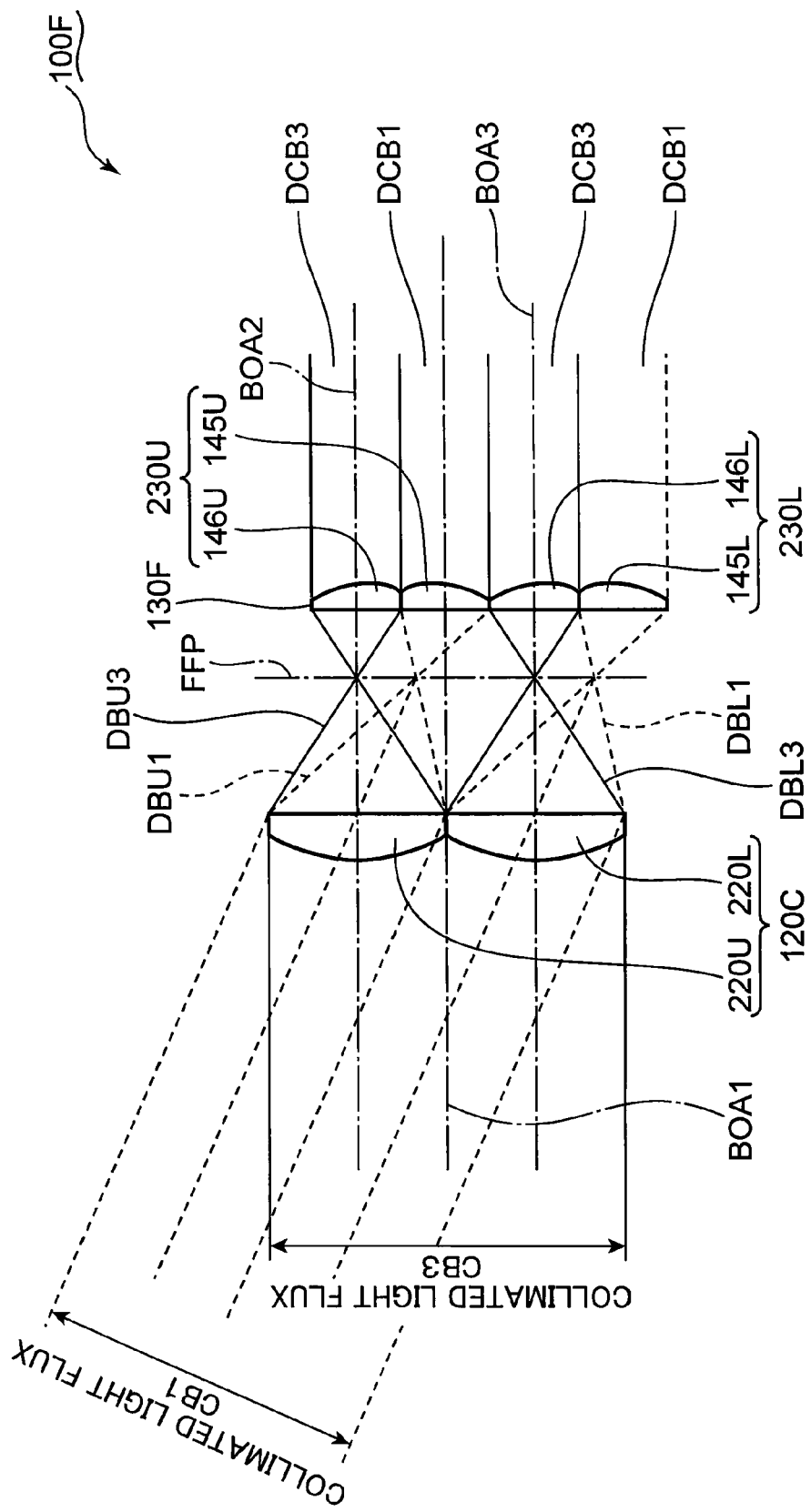
FIG. 14 is a schematic view showing an optical path in the optical multiplexing apparatus depicted in FIG. 13.

FIG. 14 is a schematic view showing an optical path in the optical multiplexing apparatus 100F. The optical multiplexing apparatus 100F is further described with reference to FIGS. 13 and 14.

The solid line in FIG. 14 indicates an optical path of the light emitted from the light source unit 115. The dotted line in FIG. 14 indicates an optical path of the light emitted from the light source unit 111.

As the first lens portion 120C, FIG. 14 shows a part of the cylindrical lens array (upper cylindrical lens 220U and lower cylindrical lens 220L). The terms "upper" and "lower" in the following description are used to make description clear without limiting the principle of this embodiment.

The collimated light flux CB3 are split into a split light flux DBU3, which is emitted from the upper cylindrical lens 220U, and a split light flux DBL3, which is emitted through the lower cylindrical lens 220L. The collimated light flux CB1 is split into a split light flux DBU1, which is emitted through the upper cylindrical lens 220U, and a split beams DBL1, which is emitted through the lower cylindrical lens 220L.

As the second lens portion 130F, FIG. 14 shows a part of the cylindrical lens array (upper cylindrical lens 230U and lower cylindrical lens 230L). The upper cylindrical lens 230U includes a first lens piece 145U and a second lens piece 146U which is formed above the first lens piece 145U. The lower cylindrical lens 230L includes a first lens piece 145L and a second lens piece 146L which is formed above the first lens piece 145L.

The center of the second lens portion 130F is shifted downward so that the optical axis BOA2 defined between the upper cylindrical lens 220U, which is used as a part of the first lens portion 120C, and the second lens piece 146U of the upper cylindrical lens 230U, which is used as a part of the second lens portion 130F, becomes parallel with the aforementioned optical axis BOA1. As a result, the optical axis BOA3 defined between the lower cylindrical lens 220L, which is used as a part of the first lens portion 120C, and the second lens piece 146L of the lower cylindrical lens 230L, which is used as a part of the second lens portion 130F, also becomes parallel with the aforementioned optical axis BOA1.

The split light flux DBU3 emitted through the upper cylindrical lens 220U of the first lens portion 120C propagates along the optical axis BOA2. The split light flux DBL3 emitted through the lower cylindrical lens 220L of the first lens portion 120C propagates along the optical axis BOA3.

The second lens pieces 146U, 146L of the second lens portion 130F define the common front focal plane FFP for the split light fluxes DBU3, DBL3. A convergent position of the split light flux DBU3 emitted through the upper cylindrical lens 220U of the first lens portion 120C matches the front focal point of the second lens piece 146U of the front focal plane FFP. Likewise, a convergent position of the split light flux DBL3, which is emitted through the lower cylindrical lens 220L of the first lens portion 120C, matches the front focal point of the second lens piece 146L of the front focal plane FFP.

The collimated light flux CB1 emitted above the collimated light flux CB3 enters the first lens portion 120C on a slant. The first lens portion 120C splits the collimated light flux CB1 into the split light fluxes DBU1, DBL1. The split light fluxes DBU1, DBL1 converge on the front focal plane FFP. The first lens pieces 145U, 145L of the second lens portion 130F define the focal points of the split light fluxes DBU1, DBL1 on the front focal plane FFP. The focal points of the split light fluxes DBU1, DBL1 defined by the first lens pieces 145U, 145L match the convergent positions of the split light fluxes DBU1, DBL1.

According to this optical design, the split light fluxes DBU3, DBL3 enter the second lens pieces 146U, 146L of the second lens portion 130F, respectively. The second lens pieces 146U, 146L of the second lens portion 130F create the collimated light fluxes DCB3 from the split light fluxes DBU3, DBL3. The split light fluxes DBU1, DBL1 enter the first lens pieces 145U, 145L of the second lens portion 130F, respectively. The first lens pieces 145U, 145L of the second lens portion 130F create the collimated light fluxes DCB1 from the split light fluxes DBU1, DBL1. As a result, light, in which the collimated light fluxes DCB1, DCB3 are alternately arranged, is emitted from the second lens portion 130F.

<Eighth Embodiment>

Figure 15:
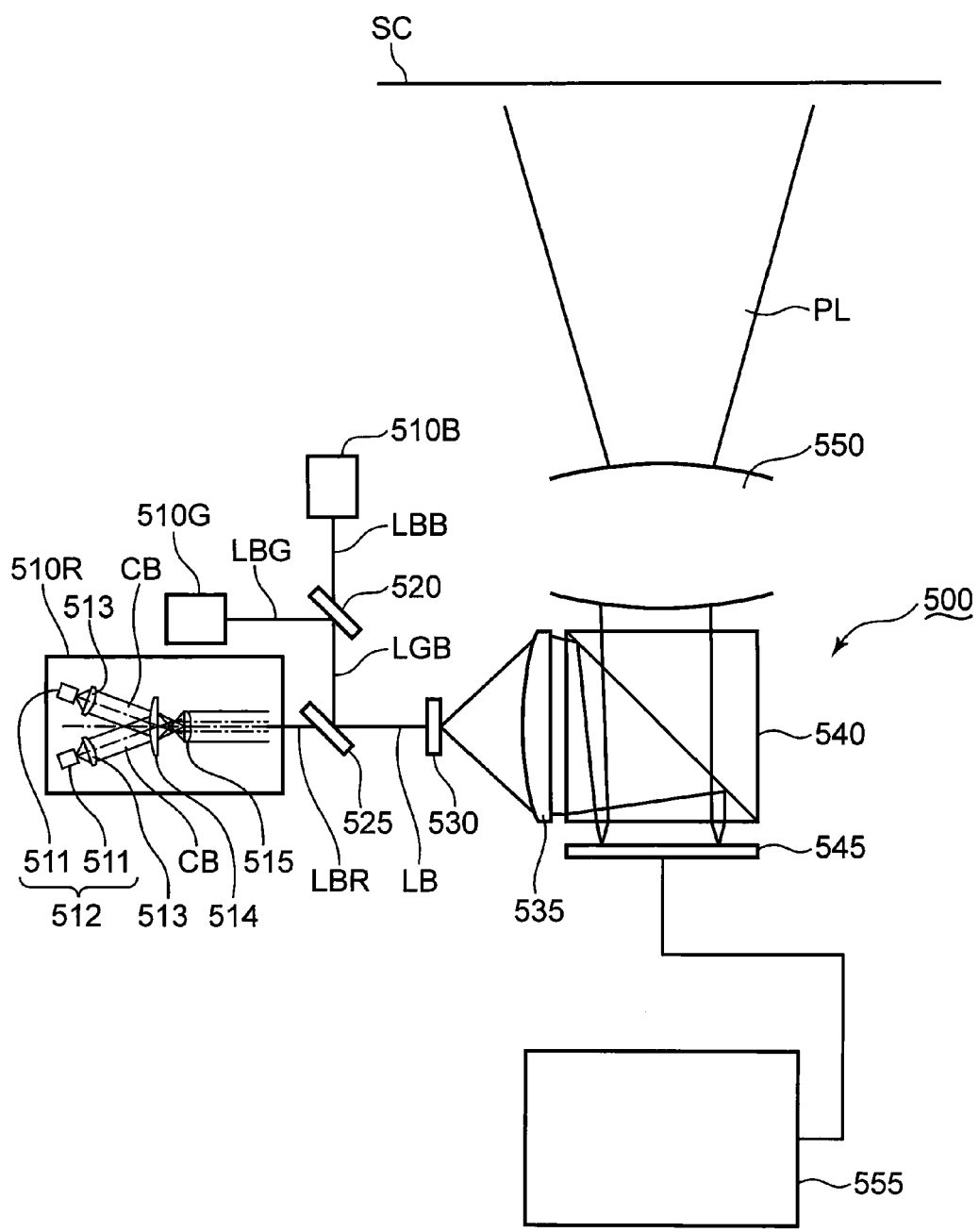
FIG. 15 is a schematic view showing a projector according to the eighth embodiment.

FIG. 15 is a schematic view showing a projector 500 according to the eighth embodiment. The projector 500 is described with reference to FIG. 15.

(Configuration of Projector)

The projector 500 has a blue laser source 510B, which emits a blue laser beam LBB, a green laser source 510G, which emits a green laser beam LBG, and a red laser source 510R, which emits a red laser beam LBR. The principle of the optical multiplexing apparatus described in the first to seven embodiments is applied to the red laser source 510R.

The red laser source 510R has a light source section 512, which includes red semiconductor light sources 511. The light source section 512 includes collimate lenses 513, which corresponds to the red semiconductor laser sources 511. The light source section 512 uses the collimate lenses 513 to emit collimated light fluxes CB. The red semiconductor laser source 511 corresponds to the light source unit described in the first to seventh embodiments.

The red laser source 510R includes a first lens portion 514, which receives the collimated light fluxes CB emitted from the light source section 512, and a second lens portion 515, which receives transmitted light through the first lens portion 514. The first and second lens portions 514, 515 multiplex the collimated light fluxes CB according to the principle described in the first to seventh embodiments, so as to create the red laser beam LBR.

The projector 500 also has a dichroic mirror 520. The blue and green laser sources 510B, 510G emit the blue and green laser beams LBB, LBG to the dichroic mirror 520, respectively. The dichroic mirror 520 allows passage of the blue laser beam LBB and reflects the green laser beam LBG. As a result, the blue and green laser beams LBB, LBG are multiplexed, and then the multiplexed beam is emitted through the dichroic mirror 520 as the laser beam LGB.

The projector 500 also has a dichroic mirror 525. The laser beam LGB propagates from the dichroic mirror 520 to the dichroic mirror 525. The red laser source 510R emits the red laser beam LBR toward the dichroic mirror 525. The dichroic mirror 525 reflects the laser beam LGB, and allows passage of the red laser beam LBR. As a result, the laser beam LGB is multiplexed with the red laser beam LBR by the dichroic mirror 525, and then emitted as the laser beam LB.

The projector 500 also has a diffusing plate 530. The aforementioned laser beam LB enters the diffusing plate 530. The diffusing plate 530 diffuses the laser beam LB.

The projector 500 also has a field lens 535. The field lens 535 condenses the laser beam LB diffused by the diffusing plate 530.

The projector 500 also has a polarizing beam splitter 540, which receives the laser beam LB from the field lens 535, and a spatial light modulator 545. A reflection type liquid crystal panel called LCoS is exemplified as the spatial light modulator 545.

The projector 500 also has a projecting lens 550. The polarizing beam splitter 540 is situated between the projecting lens 550 and the spatial light modulator 545. The laser beam LB modulated by the spatial light modulator 545 is emitted from the projector 500 as the projecting light PL via the polarizing beam splitter 540 and the projecting lens 550.

(Operation of Projector)

Operation of the projector 500 is described with reference to FIG. 15.

The blue laser source 510B emits the blue laser beam LBB toward the dichroic mirror 520. The green laser source 510G also emits the green laser beam LBG toward the dichroic mirror 520. The dichroic mirror 520 allows passage of the blue laser beam LBB, and reflects the green laser beam LBG toward the dichroic mirror 525. As a result, the blue and green laser beams LBB, LBG are multiplexed and propagated toward the dichroic mirror 525 as the laser beam LGB.

The light emitted from the red semiconductor laser sources 511 are collimated by the collimate lenses 513 and becomes the collimated light fluxes CB. The collimated light fluxes CB then enter the first lens portion 514. The first and second lens portions 514, 515 do the multiplex according to the principle described in the first to seventh embodiments to create the red laser beam LBR.

The red laser source 510R emits the red laser beam LBR toward the dichroic mirror 525. The dichroic mirror 525 allows passage of the red laser beam LBR, and reflects the laser beam LGB generated by the dichroic mirror 520 toward the diffusing plate 530. As a result, the laser beam LB, which includes components of the blue laser beam LBB, the green laser beam LBG and the red laser beam LBR, is generated.

As a result of the multiplex by the dichroic mirror 525, the generated laser beam LB is emitted toward the diffusing plate 530. The diffusing plate 530 diffuses the laser beam LB. Then, the laser beam LB is condensed to the spatial light modulator 545 by the field lens 535 and the polarizing beam splitter 540.

The projector 500 also has a signal processor 555 configured to control the spatial light modulator 545. Video signals for displaying an image are input to the signal processor 555. The signal processor 555 processes the video signals to generate control signals for controlling the spatial light modulator 545.

The spatial light modulator 545 operates in response to the control signal from the signal processor 555 to form a two-dimensional image. In other words, the spatial light modulator 545 modulates and reflects red, green and blue lights in response to the control signals from the signal processor 555. In this embodiment, the light reflected by the spatial light modulator 545 is exemplified as the image light.

The light reflected by the spatial light modulator 545 transmits through the polarizing beam splitter 540, and is emitted from the projector 500 as the projecting light PL via the projecting lens 550. As a result, an image of the projecting light PL is formed on the screen SC, which faces the projecting lens 550. In this embodiment, the projecting lens 550 is exemplified as the optical system which forms an image by means of the image light.

As described above, the principle of the optical multiplexing apparatus described in the first to seventh embodiments is applied to the red laser source 510R. Therefore, the optical system (dichroic mirror 525, diffusing plate 530, field lens 535, polarizing beam splitter 540, spatial light modulator 545 and projecting lens 550) for processing the red laser beam LBR, which is emitted by the red laser source 510R, and the laser beam LB, which includes components of the red laser beam LBR, may become compact. The projector 500 may use a compact optical system to multiplex the red laser beam LBR with other laser beams (blue and green laser beams LBB, LBG), and convert the multiplexed laser beam LB into the projecting light PL. Therefore, the projector 500 may become compact and emit the highly bright projecting light PL.

In general, a red semiconductor laser source used for a projector emits a red laser beam in a 630 nm to 645 nm wavelength range. Such a red semiconductor laser source has usually poor temperature characteristics. Typically, an output of the red semiconductor laser source drops under a high temperature environment.

In this embodiment, the projector 500 uses a few number of the semiconductor laser sources 511 to emit the red laser beam LBR. Therefore, the projector 500 may maintain high brightness even under a high temperature environment.

In this embodiment, the principle of the optical multiplexing apparatus described in the first to seventh embodiments is applied to the red laser source 510R. In order to emit the highly bright projecting light, the principle of the optical multiplexing apparatus described in the first to seventh embodiments may be applied additionally to the blue and/or green laser sources as well. If the blue/green laser source has a few light source units, the brightness of the blue/green laser beam may be increased.

In this embodiment, the light source units simultaneously emit light. Alternatively, a part of the light source units does not have to emit in an early period of operating the optical multiplexing apparatus and the projector. If an unused light source unit emits light during a period after other light source units start to deteriorate, a life of the optical multiplexing apparatus and the projector becomes long.

In this embodiment, the projector 500 is exemplified as an apparatus in which the optical multiplexing apparatus is built-in. The principle of the optical multiplexing apparatus described in the first to seventh embodiments may be used for other illumination applications.

In this embodiment, the projector 500 has a reflection type liquid crystal panel as the spatial light modulator 545. A transmission type liquid crystal panel or a DMD (R) may be used instead of the reflection type liquid crystal panel.

In this environment, the red laser source 510R emits collimated light fluxes of the red laser beam LBR from the second lens portion 515. Alternatively, convergent light of the red laser beam LBR may be emitted from the second lens portion 515. Therefore, the optical system for processing the red laser beam and the laser beam including components of the red laser beam (dichroic mirror, diffusing plate, field lens, polarizing beam splitter, spatial light modulator and projecting lens) may be further downsized.

The aforementioned embodiments are merely exemplary. Therefore, the principle of the embodiments is not limited to the aforementioned detailed description and information included in the drawings. It is apparent that those skilled in the art can make numerous modifications, combining and omitting within a scope of the principle of the aforementioned embodiments.

The aforementioned embodiments primarily have the following features.

An optical multiplexing apparatus according to one aspect of the embodiments comprises: a light source section which uses light source units to emit collimated beams; a first lens portion which focuses the incident collimated beams at different incident angles from each other to define convergent positions; and a second lens portion which has focal points that correspond to the convergent positions, respectively, wherein the first and second lens portions form an optical reduction system, and an optical axis of the second lens portion, which is directed to the corresponding focal point to one of the convergent positions, extends along another optical axis of the second lens portion, which is directed to the corresponding focal point to another of the convergent positions.

According to the aforementioned configuration, the light source units of the light source section emit the collimated beams. The collimated beams enter the first lens portion at different incident angles from each other. The collimated beams are focused by the first lens portion, which defines the convergent positions. The second lens portion, which forms the optical reduction system with the first lens portion, has the focal points which correspond to for the convergent positions, respectively. The optical axis of the second lens portion, which is directed to the corresponding focal point to one of the convergent positions, extends along another optical axis of the second lens portion, which is directed to the corresponding focal point to another of the convergent positions. Therefore, a collimated and multiplexed beam is obtained by means of the light sources. The optical reduction system, which the first and second lens portions form, reduces a diameter of the multiplexed beam. Therefore, the optical system may provide bright illumination without requiring a large optical system after the second lens portion. An increase in a quantity of the light source units results in a brighter light emission. The incident angle to the first lens portion may be adjusted so as to increase a quantity of the light source unit. Since a quantity of the light source units may be easily changed, the optical multiplexing apparatus becomes very practical.

In the aforementioned configuration, it is preferable that the light source units include a first light source unit which emits the collimated beam so that the collimated beam travels along an optical axis of the first lens portion.

According to the aforementioned configuration, the light source units include the first light source unit which emits the collimated beams so that the collimated beam travels along the optical axis of the first lens portion. Therefore, it becomes easy to match optical axes of an optical system with each other in the optical multiplexing apparatus.

In the aforementioned configuration, it is preferable that the light source units include light source units which are symmetrically arranged with respect to an optical axis of the first lens portion.

According to the aforementioned configuration, the light source units include light source units which are symmetrically arranged with respect to the optical axis of the first lens portion. Therefore, the optical multiplexing apparatus has a symmetric structure, which facilitates to manufacture the optical multiplexing apparatus.

In the aforementioned configuration, it is preferable that the first lens portion includes a first cylindrical lens array which splits and focuses the collimated beams so as to create split beams, and the second lens portion includes a second cylindrical lens array which collimates the split beams to create collimated beams.

According to the aforementioned configuration, the first lens portion includes the first cylindrical lens array which splits and focuses the collimated beams so as to create the split beams. The second lens portion includes a second cylindrical lens array, which collimates the split beams to create the collimated beams. Therefore, the multiplexed light has less fluctuated intensity distribution.

In the aforementioned configuration, it is preferable that the first lens portion includes a first micro-lens array which splits and focuses the collimated beams so as to create split beams, and the second lens portion includes a second micro-lens array which collimates the split beams to create collimated beams.

According to the aforementioned configuration, the first lens portion includes the first micro-lens array, which splits and focuses the collimated beams so as to create the split beams. The second lens portion includes the second micro-lens array, which collimates the split beams to create the collimated beams. Therefore, the multiplexed light has a less fluctuated intensity distribution.

In the aforementioned configuration, it is preferable that a reduction ratio of the optical reduction system is no more than an inverse number of a quantity of the light source units included in the light source section.

According to the aforementioned configuration, a reduction ratio of the optical reduction system is no more than an inverse number of a quantity of the light source units included in the light source section, which facilitates to deploy the second lens portion.

In the aforementioned configuration, it is preferable that the second lens portion is a concave lens.

According to the aforementioned configuration, the second lens portion is a concave lens. Therefore, the optical system of the optical multiplexing apparatus may be downsized.

In the aforementioned configuration, it is preferable that the second lens portion is formed on a substrate on which the first lens portion is formed, the substrate includes a first surface, on which the first lens portion is formed, and a second surface opposite to the first surface, and the second lens portion is formed on the second surface.

According to the aforementioned configuration, the second lens portion is formed on the substrate, on which the first lens portion is formed. The substrate has the first surface, on which the first lens portion is formed, and the second surface opposite to the first surface. The second lens portion is formed on the second surface. The integration of the first and second lens portions results in a decreased number of parts in the optical multiplexing apparatus.

In the aforementioned configuration, it is preferable that the optical axis of the second lens portion is shifted from an optical axis of the first lens portion by f sin θ.

According to the aforementioned configuration, the optical axis of the second lens portion is shifted from the optical axis of the first lens portion by f sin θ. Therefore, beams from the light source units may be appropriately multiplexed.

In the aforementioned configuration, it is preferable that the light source units include a second light source unit which emits the collimated beam that travels in an inclined direction from the optical axis of the first lens portion.

According to the aforementioned configuration, the light source units include the second light source unit which emits the collimated beams that travels in an inclined direction from the optical axis of the first lens portion. Therefore, it becomes easy to adjust a quantity of the light sources.

A projector according to another aspect of the embodiments has: a signal processor which processes a video signal for displaying an image to generate a control signal; the aforementioned optical multiplexing apparatus; a spatial light modulator which modulates light from the optical multiplexing apparatus in response to the control signal to create image light; and an optical system configured to form the image by means of the image light.

According to the aforementioned configuration, the signal processor of the projector processes the video signal for displaying an image to generate a control signal. The spatial light modulator of the projector modulates the light from the optical multiplexing apparatus in response to the control signal to create image light. The optical system of the projector forms the image by means of the image light. Since the projector has the optical multiplexing apparatus, an optical system of the projector may be downsized.

Industrial Applicability

The principle of the embodiments allows usage of a compact optical system. The principle of the embodiments also allows adjustment of a quantity of light sources to achieve required brightness. Therefore, the principle of the embodiments may be suitable for illuminators and other apparatuses which require multiplexed beams. The principle of the embodiments is particularly suitable for an image projection apparatus such as a projector.

The invention claimed is:
1. An optical multiplexing apparatus, comprising:
    a light source section including first and second light source units that emit collimated beams;
    a first lens portion which focuses each of the collimated beams to define a focal plane including a respective convergent point; and a second lens portion situated between the first lens portion and the focal plane and having plural focal points, each focal point of the second lens portion corresponding in position to a respective one of the convergent points formed by the first lens portion, wherein the first and second lens portions form an optical reduction system, wherein an optical axis of the second lens portion, which is directed to the corresponding focal point of one of the convergent points, extends along another optical axis of the second lens portion, which is directed to the corresponding focal point of another of the convergent points, and wherein the first light source unit emits one of the collimated beams toward the first lens portion, and the second light source unit emits another of the collimated beams toward the first lens portion at an incident angle different from the one of the collimated beams.

2. The optical multiplexing apparatus according to claim 1, wherein
the collimated beam from the first light source travels along an optical axis of the first lens portion.

3. The optical multiplexing apparatus according to claim 1, wherein
the first and second light source units are symmetrically arranged with respect to an optical axis of the first lens portion.

4. The optical multiplexing apparatus according to claim 1, wherein
a reduction ratio of the optical reduction system is no more than an inverse number of a quantity of light source units included in the light source section.

5. The optical multiplexing apparatus according to claim 1, wherein
the second lens portion is a concave lens.

6. The optical multiplexing apparatus according to claim 1, wherein
the second lens portion is formed on a substrate on which the first lens portion is formed,
the substrate includes a first surface, on which the first lens portion is formed, and a second surface opposite to the first surface, and
the second lens portion is formed on the second surface.

7. An optical multiplexing apparatus, comprising:
a light source section including first and second light source units that emit collimated beams;
a first lens portion which focuses each of the collimated beams to form a respective convergent point; and
a second lens portion having plural focal points, each focal point of the second lens portion corresponding in position to a respective one of the convergent points formed by the first lens portion, wherein
the first and second lens portions form an optical reduction system,
an optical axis of the second lens portion, which is directed to the corresponding focal point of one of the convergent points, extends along another optical axis of the second lens portion, which is directed to the corresponding focal point of another of the convergent points, and
the first light source unit emits one of the collimated beams toward the first lens portion, and the second light source unit emits another of the collimated beams toward the first lens portion at an incident angle different from the one of the collimated beams;
wherein the first lens portion has a focal length f,
wherein an incident angle of the collimated beam from the first light source unit is $+\theta$ at the first lens portion, and an incident angle of the collimated beam from the second light source unit is $-\theta$ at the first lens portion,
wherein the optical axes of the second lens portion are shifted from an optical axis of the first lens portion by $f \sin \theta$.

8. The optical multiplexing apparatus according to claim 2, wherein
the collimated beam from the second light source unit travels in an inclined direction from the optical axis of the first lens portion.

9. A projector, comprising:
a signal processor which processes a video signal for displaying an image to generate a control signal;
the optical multiplexing apparatus according to claim 1;
a spatial light modulator which modulates light from the optical multiplexing apparatus in response to the control signal to create image light; and
an optical system configured to form the image from the image light.

* * * * *